(12) United States Patent
Nakamura et al.

(10) Patent No.: US 8,887,098 B2
(45) Date of Patent: Nov. 11, 2014

(54) COMPUTER GRAPHICS GENERATING APPARATUS, COMPUTER GRAPHICS GENERATING METHOD, AND PROGRAM

(75) Inventors: Sensaburo Nakamura, Shizuoka (JP); Norimasa Ozaki, Kanagawa (JP); Takeo Ugai, Kanagawa (JP); Toshimasa Kakihara, Kanagawa (JP)

(73) Assignee: Sony Corporation, Tokyo (JP)

( * ) Notice: Subject to any disclaimer, the term of this patent is extended or adjusted under 35 U.S.C. 154(b) by 816 days.

(21) Appl. No.: 13/075,930

(22) Filed: Mar. 30, 2011

(65) Prior Publication Data

US 2011/0252367 A1 Oct. 13, 2011

(30) Foreign Application Priority Data

Apr. 7, 2010 (JP) ................................ P2010-089029

(51) Int. Cl.
*G06F 3/048* (2013.01)

(52) U.S. Cl.
USPC ........... 715/849; 715/248; 715/744; 715/757; 715/763; 715/765

(58) Field of Classification Search
CPC ....... H04L 67/32; H04L 65/60; H04L 65/403; G06T 19/00
USPC .......................... 715/248, 744, 757, 763, 765
See application file for complete search history.

(56) References Cited

U.S. PATENT DOCUMENTS

| 7,348,982 B2 * | 3/2008 | Schorr et al. ................. 345/441 |
| 2002/0034377 A1 * | 3/2002 | Numata ........................ 386/111 |
| 2008/0136822 A1 * | 6/2008 | Schorr et al. ................. 345/441 |

FOREIGN PATENT DOCUMENTS

| JP | 2-216588 | 8/1990 |
| JP | 2001-195604 | 7/2001 |
| JP | 2002 369076 | 12/2002 |
| JP | 2008-541286 | 11/2008 |

* cited by examiner

*Primary Examiner* — Namitha Pillai
(74) *Attorney, Agent, or Firm* — Frommer Lawrence & Haug LLP; William S. Frommer; Ellen Marcie Emas

(57) ABSTRACT

Disclosed herein is a generating apparatus including a display controller configured, on the basis of computer graphics description data for use in creating a computer graphics virtual space necessary for generating a computer graphics image, to display a plurality of element descriptors representative of a plurality of elements arranged in the computer graphics virtual space; and a specification information generator configured to generate specification information for specifying a parameter for defining an element corresponding to an element descriptor by a selecting operation by a user from among the displayed plurality of element descriptors as a parameter subject to adjustment that is adjusted by an adjusting operation by the user.

8 Claims, 17 Drawing Sheets

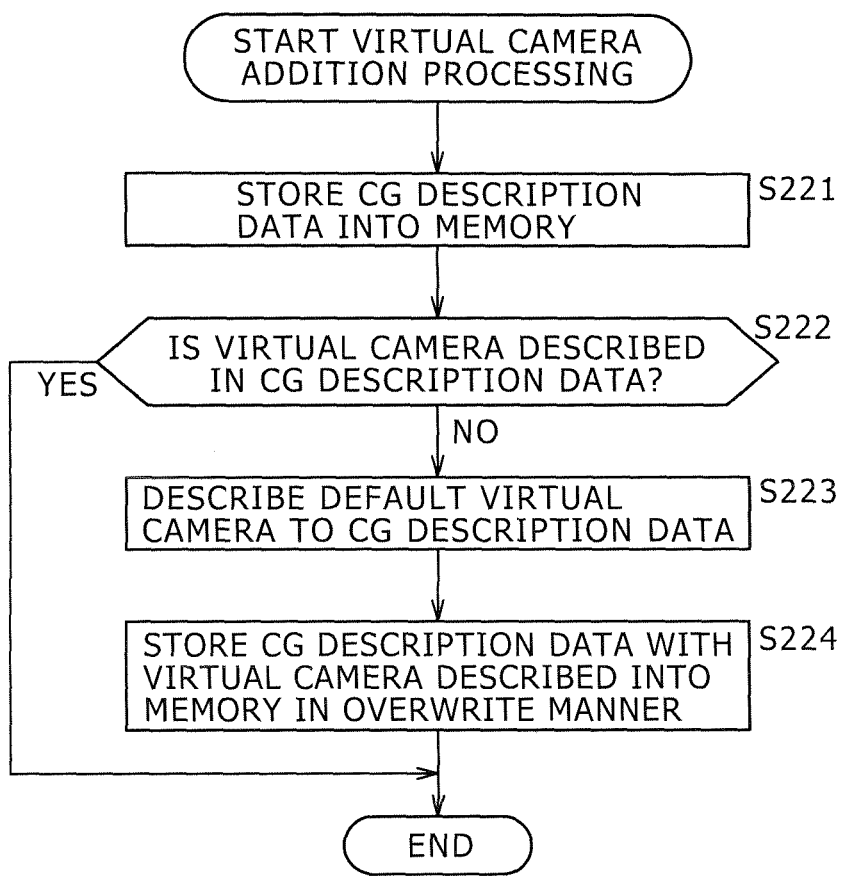

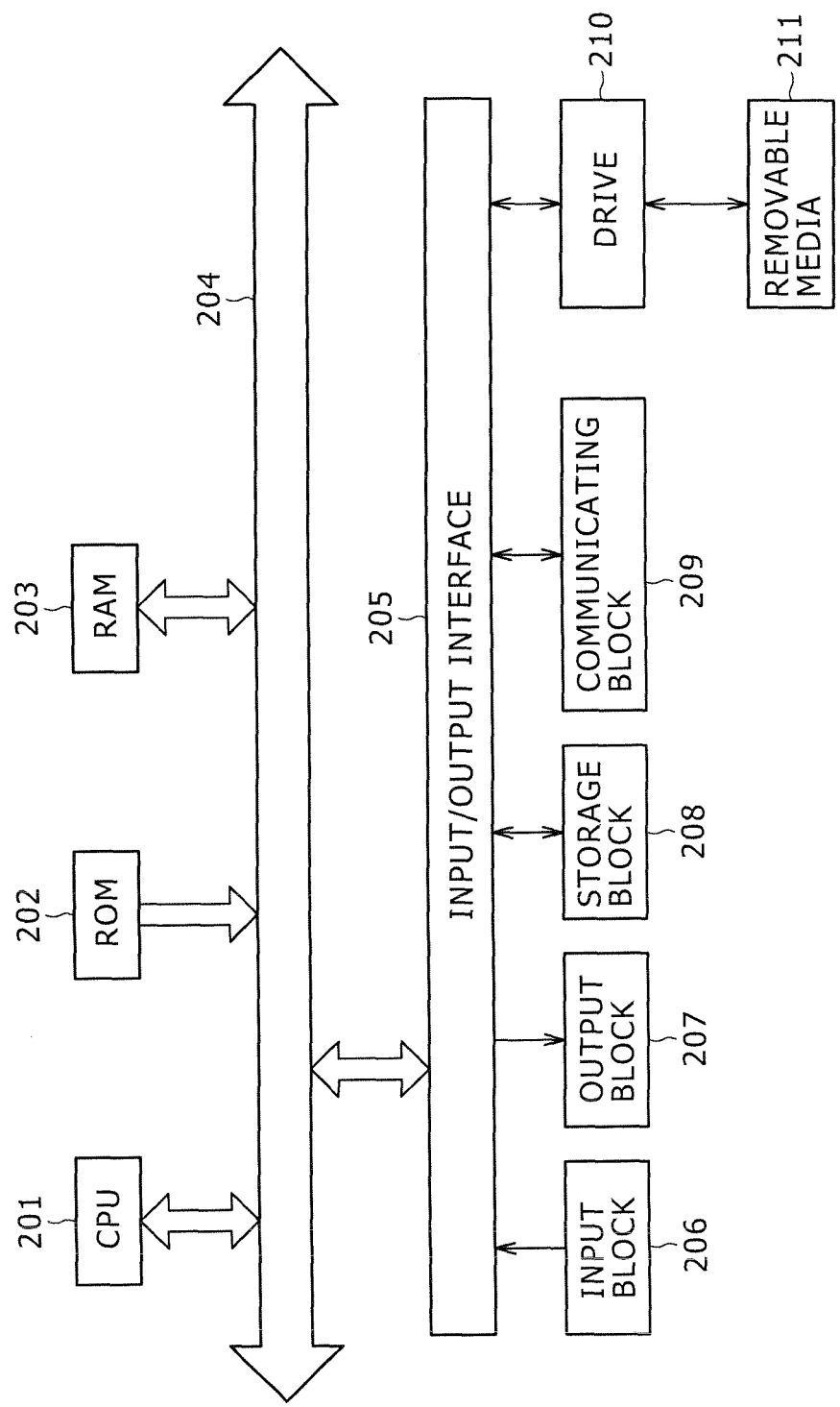

COMPUTER GRAPHICS GENERATING APPARATUS, COMPUTER GRAPHICS GENERATING METHOD, AND PROGRAM

BACKGROUND OF THE INVENTION

1. Field of the Invention

The present invention relates to a generating apparatus, a generating method, and a program and, more particularly, to a generating apparatus, a generating method, and a program that are configured to easily generate specification information for use in specifying parameters that are adjusted when manipulating CG (Computer Graphics) data for example.

2. Description of the Related Art

A technique for synthesizing CG images is known (refer to Japanese Patent Laid-open No. 2002-369076 for example).

In the above-mentioned technique, two or more CG images created by rendering two or more pieces of CG data created by a CG creator are held in a server in advance and, of these two or more CG images held in the server, the CG images selected by the selection operation by a user are synthesized with images subject to synthesis.

SUMMARY OF THE INVENTION

However, if it is desired to use for synthesis the two or more CG images held in a server beforehand after manipulating these CG images, the above-mentioned related-art technique does not allow the use of the manipulated CG images for synthesis unless CG data is manipulated by a CG creator and the CG image obtained by rendering the manipulated CG data is stored in a server.

Therefore, the present invention addresses the above-identified and other problems associated with related-art methods and apparatuses and solves the addressed problems by providing a generating apparatus, a generating method, and a program that are configured to facilitate, in the synthesis of CG images for example, the creation of parameter specification information (hereafter referred to simply as specification information) for specifying the parameters subject to adjustment so as to be able of manipulate CG images by adjusting the parameters for use in the creation of CG images on the basis of an adjusting operation done by a user.

In carrying out the invention and according to one embodiment thereof, there is provided a generating apparatus. This generating apparatus has display control means for, on the basis of CG (Computer Graphics) description data for use in creating a CG virtual space necessary for generating a CG image, displaying a plurality of element descriptors representative of a plurality of elements arranged in the CG virtual space and specification information generating means for generating specification information for specifying a parameter for defining an element corresponding to an element descriptor by a selecting operation by a user from among the displayed plurality of element descriptors as a parameter subject to adjustment that is adjusted by an adjusting operation by the user.

In the above-mentioned generating apparatus, the display control means is configured to display the plurality of element descriptors in a tree-shaped hierarchical structure.

The above-mentioned generating apparatus further has specification information holding means for holding a plurality pieces of the specification information generated by the specification information generating means, reading means for reading specification information selected by a selecting operation by the user from among the plurality of pieces of specification information held in the specification information holding means, setting means for setting a parameter specified by the specification information read as above from among a plurality of parameters included in the CG description data, as the parameter subject to adjustment, adjusting means for adjusting the parameter subject to adjustment in response to an adjusting operation by the user, and image generating means for generating the CG image on the basis of the CG description data with the parameter subject to adjustment adjusted.

In the above-mentioned generating apparatus, the display control means displays a plurality of parameters for defining an element corresponding to an element descriptor selected by the selecting operation by the user from among the plurality of displayed element descriptors and the specification information generating means generates specification information for specifying a parameter indicated by an indicating operation by a user from among the plurality of displayed parameters as the parameter subject to adjustment.

The above-mentioned generating apparatus still further has mode setting means for setting an operation mode of the generating apparatus in response to a mode setting operation by the user to one of a specification information generating mode and a parameter adjusting mode. In this configuration, the specification information generating means generates the specification information only when the generating apparatus is set to the specification information generating mode and the adjusting means adjusts the parameter subject to adjustment only when the generating apparatus is set to the parameter adjusting mode.

In carrying out the invention and according to another embodiment thereof, there is provided a generating method for a generating apparatus for generating specification information for use in CG manipulation, the generating apparatus having display control means and specification information generating means. This generating method has the steps of: on the basis of CG (Computer Graphics) description data for use in creating a CG virtual space necessary for generating a CG image, displaying a plurality of element descriptors representative of a plurality of elements arranged in the CG virtual space; and generating specification information for specifying a parameter for defining an element corresponding to an element descriptor by a selecting operation by a user from among the displayed plurality of element descriptors as a parameter subject to adjustment that is adjusted by an adjusting operation by the user.

In carrying out the invention and according to still another embodiment thereof, there is provided a program for causing a computer to function as display control means for, on the basis of CG (Computer Graphics) description data for use in creating a CG virtual space necessary for generating a CG image, displaying a plurality of element descriptors representative of a plurality of elements arranged in the CG virtual space and specification information generating means for generating specification information for specifying a parameter for defining an element corresponding to an element descriptor by a selecting operation by a user from among the displayed plurality of element descriptors as a parameter subject to adjustment that is adjusted by an adjusting operation by the user.

According to the embodiments of the present invention, on the basis CG description data for use in creating a CG virtual space necessary for generating CG images, two or more element descriptors representative of two or more elements arranged in the CG virtual space are displayed. Specification information for specifying a parameter among the displayed two or more element descriptors that defines an element corresponding to an element descriptor selected by a user's selecting operation, as a parameter subject to adjustment that is adjusted by a user's adjusting operation.

According to the embodiments of the present invention, specification information for specifying parameters subject to adjustment that are adjusted by a user's adjusting operation can be generated with ease.

BRIEF DESCRIPTION OF THE DRAWINGS

FIG. 19 is a flowchart indicative of virtual camera adding processing to be executed by the CG image generating apparatus; and FIG. 20 is a block diagram illustrating an exemplary configuration of a computer.

DETAILED DESCRIPTION OF THE PREFERRED EMBODIMENTS

This invention will be described in further detail by way of embodiments thereof with reference to the accompanying drawings. The description is made in the following order:

(1) the embodiment of the present invention (or an example of generating specification information for specifying parameters subject to adjustment that are adjusted by user's adjusting operation); and (2) variations to the above-mentioned embodiment.

(1) The Embodiment

Exemplary configuration of a cg synthesizing System 1

Figure 1:
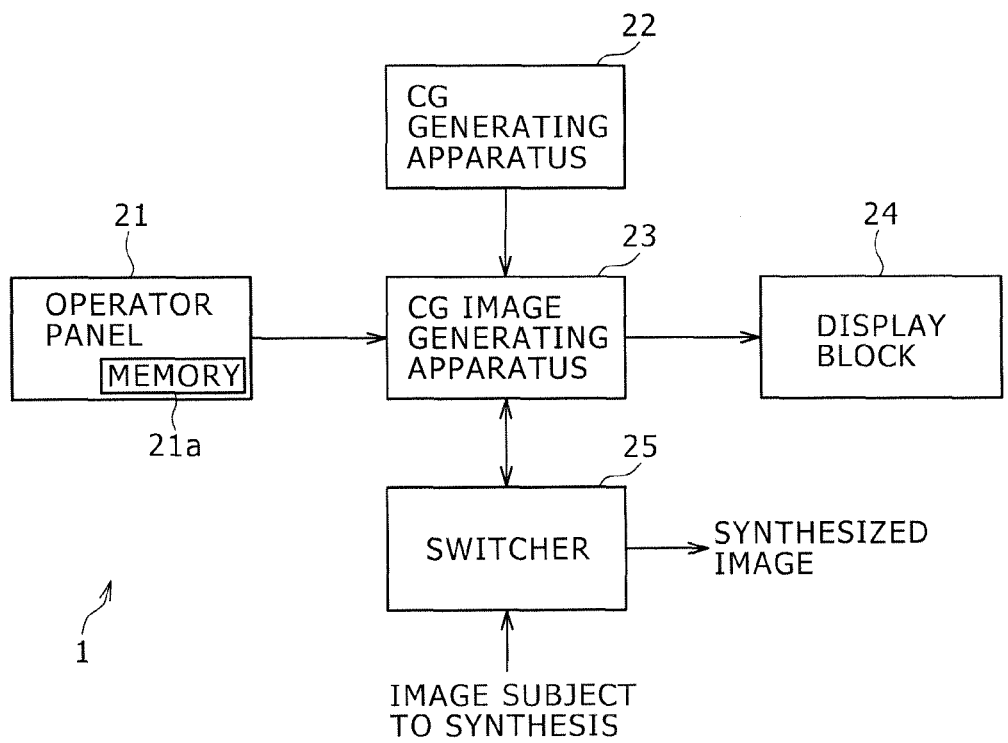
FIG. 1 is a block diagram illustrating an exemplary configuration of a CG synthesizing system practiced as one embodiment of the invention.

Now, referring to FIG. 1, there is shown an exemplary configuration of a CG synthesizing system 1 practiced as one embodiment of the invention.

The CG synthesizing system 1 is configured by an operator panel 21 in which a memory 21a is incorporated, a CG generating apparatus 22, a CG image generating apparatus 23, a display block 24, and a switcher 25.

It should be noted that the CG image generating apparatus 23 generates a VD (vertical synchronization) signal and appropriately supplies the generated VD signal to the operator panel 21 and the switcher 25. The operator panel 21, the CG image generating apparatus 23, and the switcher 25 execute the processing thereof in synchronization with the VD signal generated by the CG image generating apparatus 23. It is also practicable for the CG image generating apparatus 23 to supply a VD signal synchronized with a VD signal supplied from the outside to the operator panel 21 and the switcher 25.

The operator panel 21 is configured by adjusting knobs and a joystick for use in CG manipulation and other controls for use in generating specification information for use in CG manipulation. It should be noted that the adjusting knobs, joystick and other controls making up the operator panel 21 will be described later with reference to FIG. 2.

When the user operates the operator panel 21, the operator panel 21 generates an operation signal that corresponds to the user operation and stores the generated operation signal in the memory 21a incorporated in the operator panel 21. When a VD signal is supplied from the CG image generating apparatus 23, the operator panel 21 supplies the operation signal CG from the memory 21a to the CG image generating apparatus 23.

In response to the operation by the CG creator, the CG generating apparatus 22 generates CG description data for generating a CG image and supplies the generated CG image to the CG image generating apparatus 23 for storage. Consequently, two or more pieces of CG description data are stored in a CG description data storage block 63 of the CG image generating apparatus 23 (refer to FIG. 4).

The CG description data herein denotes the data for use in creating a scene (or a CG virtual space) necessary for generating a CG image, this data being configured by two or more elements (or the information indicative of these elements) that are arranged on the scene. Each of the elements making up CG description data is defined by two or more parameters. Therefore, two or more parameters for defining each element are included in CG description data.

To be more specific, CG description data has a polygon making up a CG object arranged on a scene and a virtual camera arranged on a scene, for example.

A polygon that is one of the elements is defined by two or more parameters representative of the position of the polygon and the color of the material (the look of surface) of the polygon, for example. The virtual camera that is one of the elements is defined by two or more parameters indicative of the three-dimensional position (x, y, z) of the virtual camera and the imaging direction of the virtual camera, for example. It should be noted that the information, such as material, other than polygon may be called an attribute; two or more CG objects may have a configuration that references one attribute.

It should be noted that the virtual camera is a camera that virtually images a CG object arranged on a scene. An image taken by the virtual camera is generated as a CG image.

The CG image generating apparatus 23 executes the processing as instructed by an operation signal supplied from the operator panel 21.

To be more specific, the CG image generating apparatus 23 supplies the data structure information indicative of a data structure of each element making up the CG description data stored in the incorporated CG description data storage block 63 to the display block 24 to display a data structure display image corresponding to the data structure information, for example.

It should be noted that the data structure display image is an image for displaying, in a tree form for example, the data structure of each element configuring CG description data. Details of the data structure display image will be described later with reference to FIG. 8.

In addition, the CG image generating apparatus 23 generates specification information for specifying the parameters for defining an element selected by a user's selecting operation from the elements configuring the CG description data as the parameters subject to adjustment by a user's adjusting operation, for example.

Figure 4:
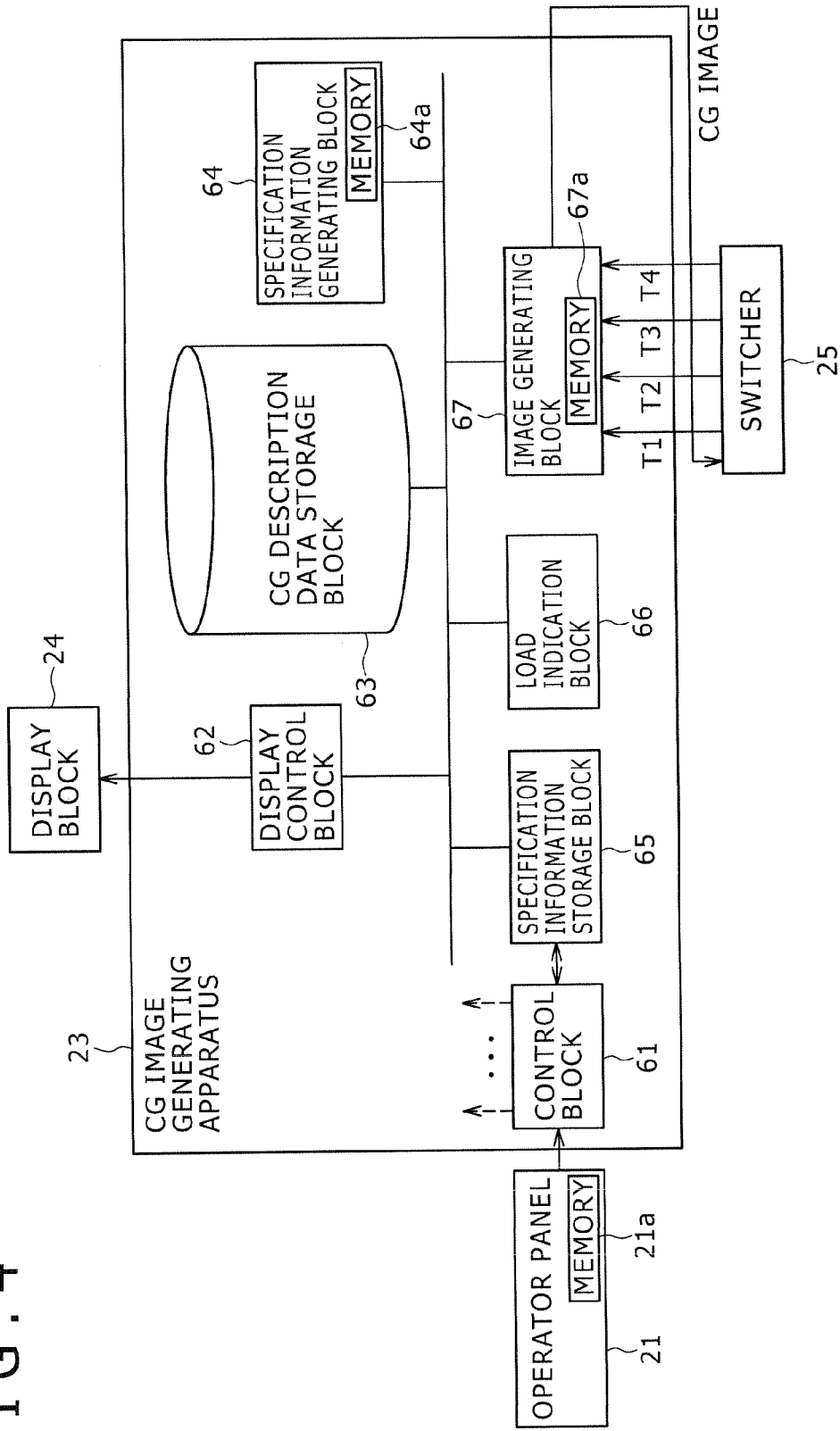
FIG. 4 is a block diagram illustrating an exemplary configuration of a CG image generating apparatus.

Then, the CG image generating apparatus 23 stores the generated specification information in an incorporated specification information storage block 65 (refer to FIG. 4). Consequently, two or more pieces of specification information are stored in the specification information storage block 65.

Further, the CG image generating apparatus 23 specifies a parameter subject to adjustment on the basis of the specification information selected by a user's selecting operation from among two or more pieces of specification information stored in the incorporated specification information storage block 65, for example. Next, in response to the user's specifying operation, the CG image generating apparatus 23 adjusts the value of the specified parameter subject to adjustment to an adjustment value corresponding to the user's adjusting operation.

Also, on the basis of the CG description data including the adjusted parameter subject to adjustment, the CG image generating apparatus 23 executes texture mapping using a texture image supplied from the switcher 25 and supplies a resultant CG image to the switcher 25, for example. It should be noted that a texture denotes an image that is mapped (or attached) to a polygon.

The display block 24 displays a corresponding data structure display image on the basis of the data structure information supplied from the CG image generating apparatus 23.

Two or more images are supplied to the switcher 25. Of the supplied two or more images, the switcher 25 supplies the images necessary for generating a CG image to the CG image generating apparatus 23.

Two or more images subject to synthesis are also supplied to the switcher 25. Of the supplied two or more images subject to synthesis, the switcher 25 selects an image subject to synthesis that is synthesized with the CG image supplied from the CG image generating apparatus 23. Next, the switcher 25 synthesizes the selected synthesis image with the CG image supplied from the CG image generating apparatus 23 and outputs a resultant synthesized image.

Details of the Operator Panel 21

Figure 2:
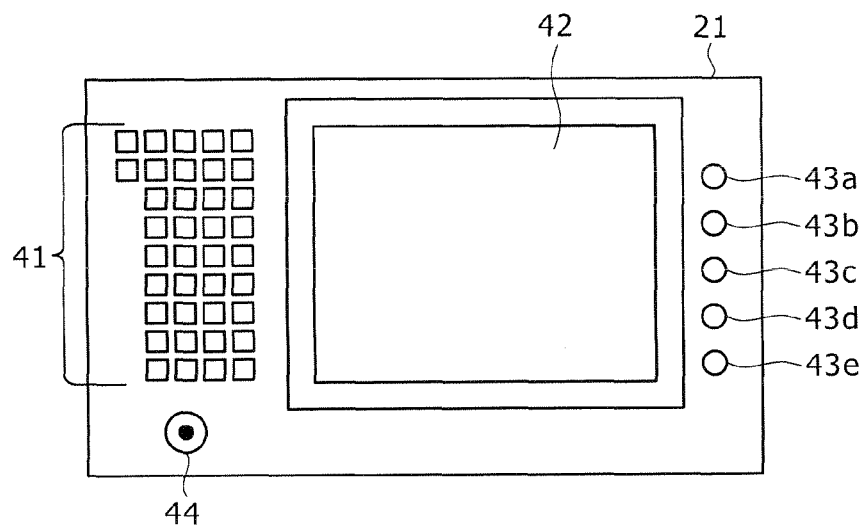
FIG. 2 is a top view of an exemplary operator panel viewed from above.

Referring to FIG. 2, there is shown a top view of the operator panel 21.

As shown in FIG. 2, the operator panel 21 is configured by operation buttons 41 through which the user executes an operation for indicating the generation of specification information, for example, a display block 42 for displaying buttons that can be operated by parameters subject to adjustment and by means of a touch panel, namely, a default recall button and so on for example for returning the value of a parameter subject to adjustment to an original value that was before adjustment, adjusting knobs 43a through 43e for adjusting parameters subject to adjustment, and a joystick 44.

It should be noted that, in what follows, the adjusting knobs 43a through 43e are generically referred to simply as the adjusting knob 43 unless otherwise specified.

Referring to FIG. 3, there are shown exemplary volumes types of the adjusting knob 43.

Figure 3A:
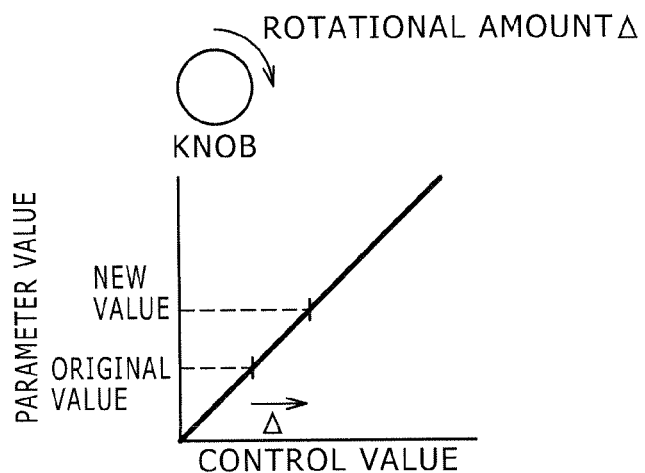
FIGS. 3A, 3B, and 3C are graphs indicative of volume types of an adjustment knob.
Figure 3B:
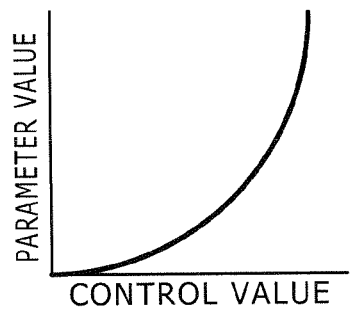
Figure 3C:
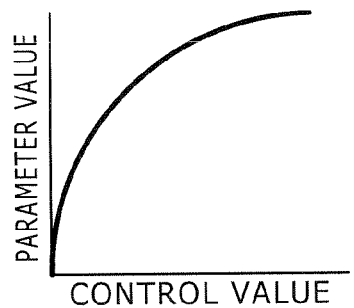

In FIG. 3A through FIG. 3C, the horizontal axis is representative of control values that change with the rotational volume of the adjusting knob 43. The vertical axis is representative of the values of parameters subject to adjustment that change with control values.

FIG. 3A shows a volume type in which, if the control value changes by $\Delta x$ in accordance with the rotational volume of the adjusting knob 43, value x of the parameter subject to adjustment is adjusted to an adjustment value $(x+\Delta x)$. It should be noted that, for the brevity of the description, the ratio between the control value and the parameter is set to 1. This holds the same in what follows and the description of this ratio is omitted.

FIG. 3B shows a volume type in which, if the control value changes by $\Delta x$ in accordance with the rotational volume of the adjusting knob 43, value $\exp(x)$ of the parameter subject to adjustment is adjusted to an adjustment value $\exp(x+\Delta x)$. It should be noted that $\exp(x)$ is indicative of the power of x Napier's number e.

FIG. 3C shows a volume type in which, if the control value changes by $\Delta x$ in accordance with the rotational volume of the adjusting knob 43, value $\log(x)$ of the parameter subject to adjustment is adjusted to an adjustment value $\log(x+\Delta x)$. It should be noted that log is indicative of natural logarithm.

The adjusting knob 43 is preset such that the value of each parameter subject to adjustment is adjusted with any one of the volume types shown in FIG. 3A through FIG. 3C, for example.

If any one of the volume types shown in FIG. 3A through FIG. 3C is specified by the specification information, the adjusting knob 43 adjusts the value of a parameter subject to adjustment by the specified volume type. It is known that these volume types are specified in accordance with the characteristic of sensory organs of parameters subject to adjustment, such as brightness adjustment and sound volume adjustment, for example.

Details of the CG Image Generating Apparatus 23

Referring to FIG. 4, there is shown an exemplary configuration of the CG image generating apparatus 23.

The CG image generating apparatus 23 is configured by a control block 61, a display control block 62, a CG description data storage block 63, a specification information generating block 64 having a memory 64a, a specification information storage block 65, a load indication block 66, and an image generating block 67 having a memory 67a. It should be noted that the display control block 62 through the image generating block 67 are interconnected by a bus.

An operation signal is supplied from the operator panel 21 to the control block 61. On the basis of the operation signal supplied from the operator panel 21, the control block 61 controls the display control block 62, the specification information generating block 64, the load indication block 66, and the image generating block 67.

In addition, the control block 61 generates a VD signal and supplies the generated VD signal to the display control block 62, the specification information generating block 64, the load indication block 66, and the image generating block 67 and, at the same time, to the operator panel 21 and the switcher 25. The operator panel 21, the switcher 25, the display control block 62, the specification information generating block 64, the load indication block 66, and the image generating block 67 execute processing in synchronization with the VD signal supplied from the control block 61. It should be noted that, of these components, the switcher 25 and the image generating block 67 must execute processing always in synchronization with the VD signal in order to execute the processing without instabilities. For the other components, the synchronization of control based on the VD signal allows the realization of smooth control and the correct processing of mutual communication procedures.

Under the control of the control block 61, the display control block 62 reads the CG description data from the CG description data storage block 63. Next, on the basis of the CG description data thus read, the display control block 62 generates data structure information representative of a data structure of this CG description data and supplies the generated data structure information to the display block 24, thereby displaying a data structure display image (refer to FIG. 8) corresponding to the data structure information.

The CG description data storage block 63 holds (or stores) two or more pieces of CG description data supplied from the CG generating apparatus 22. It should be noted that the CG description data is written by a schema language for defining a data structure, such as COLLADA.

Under the control of the control block 61, the specification information generating block 64 reads the CG description data selected by a user's selecting operation from among the two or more pieces of CG description data stored in the CG description data storage block 63 and stores the CG description data thus read into the memory 64a.

Next, the specification information generating block 64 generates specification information for specifying any one of the two or more parameters included in the CG description data stored in the memory 64a, as a parameter subject to adjustment that is adjusted through the operator panel 21, and supplies the generated specification information into the specification information storage block 65 for storage. It is also practicable for the specification information generating block 64 to group two or more pieces of specification information into one file and store this file in the specification information storage block 65 as a derived information file. In this case, the identifier of the CG description data held by the specification information generating block 64 into the memory 64a is included in this derived information file.

It should be noted that the specification information generating block 64 may generate specification information such that parameter value specification information (hereafter referred to as adjustment instruction information) for indicating the adjustment of a predetermined parameter of the two or more parameters included in the CG description data held in the memory 64a to a predetermined value is included in the specification information.

The specification information generating block 64 also generates a specification information list containing two or more pieces of specification information stored in the specification information storage block 65 and stores the generated specification information lists into the specification information storage block 65. It is also practicable for the specification information generating block 64 to generate a specification information list on an on-demand basis without storing it. In addition, it is practicable for the specification information generating block 64 to handle a list in units of derived information files rather than lists of specification information.

The specification information storage block 65 holds the two or more pieces of specification information and the specification information list supplied from the specification information generating block 64. It should be noted that the specification information is written by a language based on XML (Extensible Markup Language) for example.

Under the control of the control block 61, the load indication block 66 reads, from the specification information storage block 65, the specification information selected by the user's selecting operation from among the two or more pieces of specification information stored in the specification information storage block 65 and supplies the selected specification information to the image generating block 67. Alternatively, the load indication block 66 supplies contents of the derived information file selected by the user's selecting operation to the image generating block 67.

Also, the load indication block 66 reads, from the CG description data storage block 63, the CG description data identified by an identifier included in the specification information read from the specification information storage block 65 from among the two or more pieces of CG description data stored in the CG description data storage block 63. Alternatively, the load indication block 66 reads the CG description data from the CG description data storage block 63 by use of an identifier included in the derived information file read from the specification information storage block 65.

It should be noted that the specification information generating block 64 generates the identifiers for identifying the CG description data including a parameter that is a parameter subject to adjustment by including this identifier in the specification information or the derived information file.

Next, the load indication block 66 supplies the CG description data thus read to the image generating block 67, storing the CG description data into the memory 67a. It should be noted that the data actually held in the memory 67a to be updated in adjustment parameter is that obtained by developing CG description data into a data structure of computer program processing; however, for the brevity of description, such data is also referred to as CG description data.

The image generating block 67 stores the CG description data supplied from the load indication block 66 into the memory 67a. Then, of the two or more parameters included in the CG description data stored in the memory 67a, the image generating block 67 sets the parameter specified by the specification information supplied from the load indication block 66 (or the specification information included in the derived information file) as the parameter subject to adjustment.

Next, the image generating block 67 starts an image generating operation and then continuously adjusts the parameter subject to adjustment under the control of the control block 61. Namely, for example, when the user executes an adjusting operation for adjusting the parameter subject to adjustment through the operator panel 21, the operator panel 21 generates an operation signal corresponding to the user's adjusting operation and supplies the generated operation signal to the control block 61.

In this case, in response to the operation signal supplied from the operator panel 21, the control block 61 controls the image generating block 67 to adjust the value of the parameter subject to adjustment to an adjustment value that corresponds to the user's adjusting operation.

It should be noted that, in response to the pressing of the default recall button displayed on the display block 42 of the operator panel 21, the operator panel 21 generates a corresponding operation signal and supplies the generated operation signal to the control block 61.

In this case, in response to the operation signal supplied from the operator panel 21, the control block 61 initializes the parameter subject to adjustment included in the CG description data stored in the memory 67a of the image generating block 67 to the parameter subject to adjustment as it was before the adjustment by the user's adjusting operation.

To be more specific, for example, in response to the operation signal supplied from the operator panel 21, the control block 61 controls the load indication block 66 to read the CG description data including the parameter subject to adjustment from the CG description data storage block 63 and supply the CG description data thus read to the image generating block 67. Then, the control block 61 controls the image generating block 67 to store the CG description data supplied from the load indication block 66 to the image generating block 67 into the memory 67a in an overwrite manner.

Consequently, the CG description data stored in the memory 67a provides the CG description data as it was before the adjustment by the user's adjusting operation. It should be noted that it is also practicable to arrange two or more CG description data storage areas in the memory 67a and hold the unadjusted (or unchanged) values in the memory 67a, thereby achieving a system recovery by reading the contents of these values. Alternatively, an area for storing only values of parameters subject to adjustment may be arranged separately.

Further, the image generating block 67 may supply the CG description data with the parameter subject to adjustment adjusted to the CG description data storage block 63 to store this CG description data in an overwrite manner. Alternatively, an area for storing only the values of some parameters subject to adjustment may be arranged for to be used later by the entire CG description data and these values in combination.

The image generating block 67 generates, for every frame or every field, a CG image on the basis of the CG description data with the parameter subject to adjustment adjusted that is stored in the memory 67a and supplies the generated CG image to the switcher 25. As a result, the adjusting operation is reflected onto the CG image every frame or every field.

For example, from the switcher 25 to the image generating block 67, an image that is texture-mapped to a polygon making up a CG image generated on the basis of the CG description data stored in the memory 67a.

Next, on the basis of the CG description data stored in the memory 67a, the image generating block 67 executes the processing of texture-mapping the image supplied from the switcher 25 onto the polygon making up the CG image to be generated, thereby drawingly generating the CG image and supplying the CG image obtained by this processing to the switcher 25.

Exemplary Configuration of the Switcher 25

Figure 5:
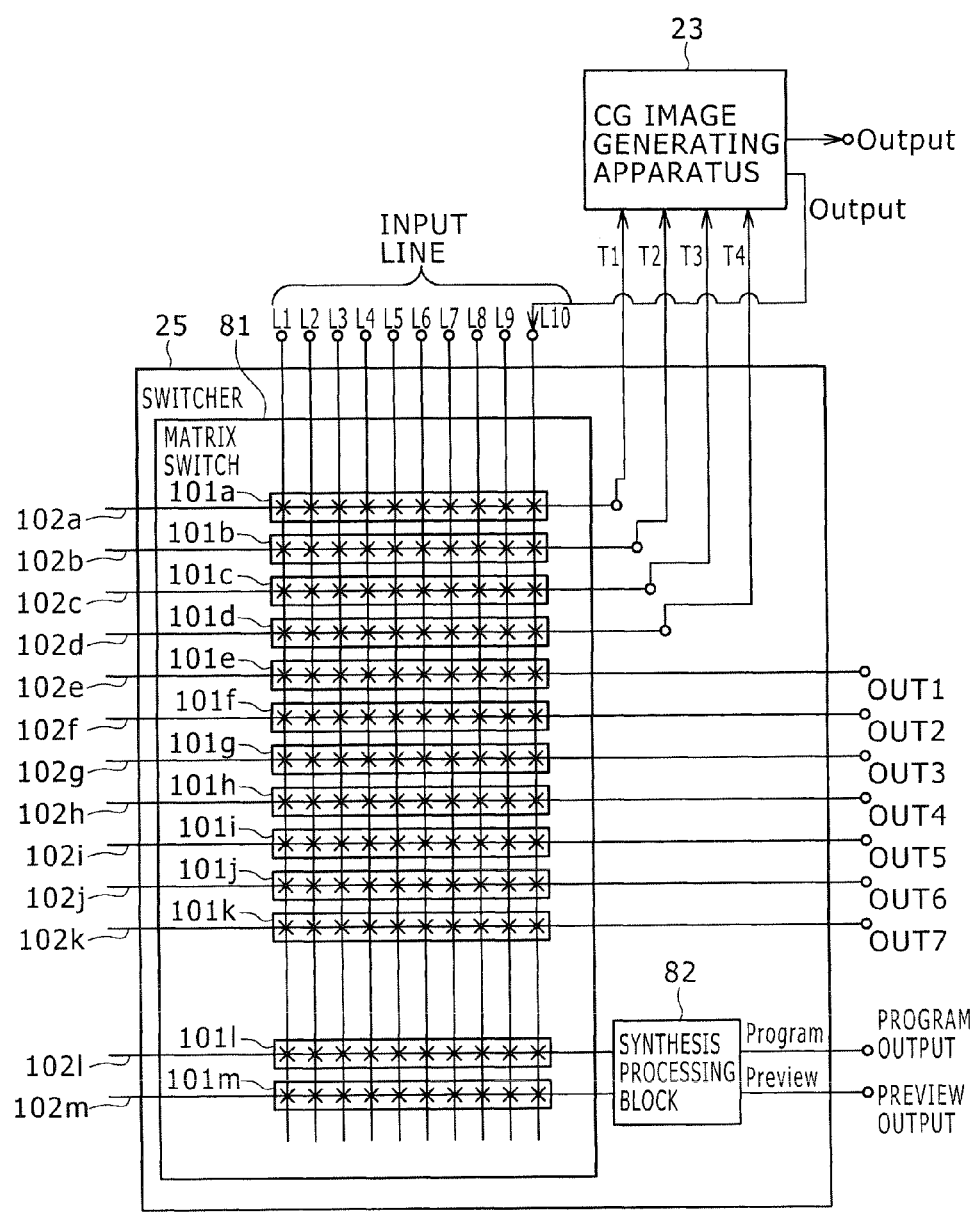
FIG. 5 is a block diagram illustrating an exemplary configuration of a switcher.

Referring to FIG. 5, there is shown an exemplary configuration of the switcher 25.

The switcher 25 is configured by a matrix switch 81, a synthesis processing block 82, and a control block, not shown.

The matrix switch 81 is configured by input lines L1 through L10, cross point switches 101a through 101m, and bus lines 102a through 102m and is controlled by the control block, not shown, in response to a control instruction given from the operator panel 21. It is also practicable to provide a configuration in which the matrix switch 81 is additionally controlled by the image generating block 67 of the CG image generating apparatus 23.

In the input lines L1 through L10, image signals supplied from the outside are entered (or supplied) to the input lines L1 through L9. A CG image is supplied to the input line L10 from the CG image generating apparatus 23. The image signals supplied from the outside are image signals that are reproduced by a VTR (Video Tape Recorder) or image signals supplied from a camera taking images in a broadcasting station studio, for example.

It should be noted that, in the input lines L1 through L10, image signals are supplied to the input lines L1 through L9 from the outside and a CG image is supplied to the input line L10 from the CG image generating apparatus 23 as described above; however, the input lines to which the image signals from the outside and the CG images are supplied are not restricted to these input lines.

In the above description, the matrix switch 81 has the ten input lines L1 through L10; however, the number of input lines is not restricted to ten, any other number being allowed for configuring this matrix switch.

The cross point switch 101a controls the connection of the points (indicated by "x") at which the bus line 102a and the input lines L1 through L10 cross each other. The cross point switch 101a outputs any one of the image signals entered in the input lines L1 through L9 to an output terminal T1 via the bus line 102a, thereby supplying the outputted image signal to the CG image generating apparatus 23.

It should be noted that the cross point switches 101b through 101d is configured in the same manner as the cross point switch 101a, executing the same processing as the cross point switch 101a.

To be more specific, the cross point switch 101b outputs any one of the images entered in the input lines L1 through L9 to an output terminal T2 via the bus line 102b, thereby supplying the outputted image to the CG image generating apparatus 23. The cross point switch 101c outputs any one of the images entered in the input lines L1 through L9 to an output terminal T3 via the bus line 102c, thereby supplying the outputted image to the CG image generating apparatus 23.

The cross point switch 101d outputs any one of the images entered in the input lines L1 through L9 to an output terminal T4 via the bus line 102d, thereby supplying the outputted image to the CG image generating apparatus 23.

The cross point switch 101e controls the connection of the points at which the bus line 102e and the input lines L1 through L10 cross each other to output any one of the images supplied from the input lines L1 through L10 to an output terminal OUT1 via the bus line 102e.

It should be noted that the cross point switches 101f through 101k are configured in the same manner as the cross point switch 101e, executing the same processing as the cross point switch 101e.

The cross point switch 101l controls the connection of the points at which the bus line 102l and the input lines L1 through L10 cross each other to supply any one of the images entered from the input lines L1 through L9 to the synthesis processing block 82 via the bus line 102l.

The cross point switch 101m controls the connections at which the bus line 102m and the input lines L1 through L10 cross each other to supply a CG image entered from the input line L10 to the synthesis processing block 82 via the bus line 102m.

The synthesis processing block 82 synthesizes the image supplied from the cross point switch 101l with the CG image for example supplied from the cross point switch 101m. Then, the synthesis processing block 82 outputs a synthesized image obtained by this synthesis processing to a preview output line for outputting this synthesized image as a preview and a program output line for outputting this synthesized image as a final synthesized image. The embodiments of the present invention are especially advantageous in an environment where the embodiments are applied to the operation of live broadcasting for example, thereby generating images having high added values based on the function of instantaneous operations.

One Example in which Cg Images Change in Response to User's Adjusting Operation

Figure 6A:
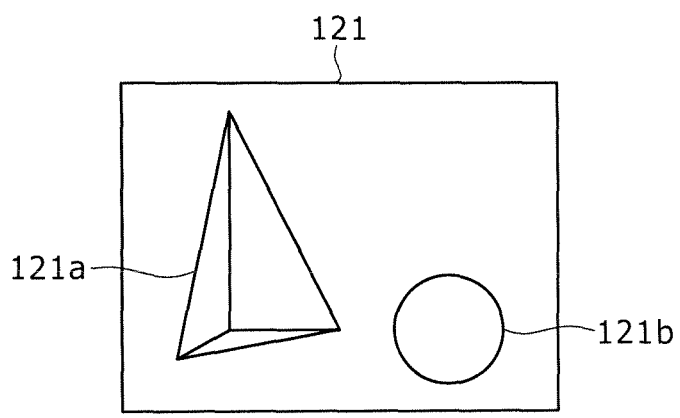
FIGS. 6A and 6B are diagrams illustrating exemplary manners of adjusting material colors.
Figure 6B:
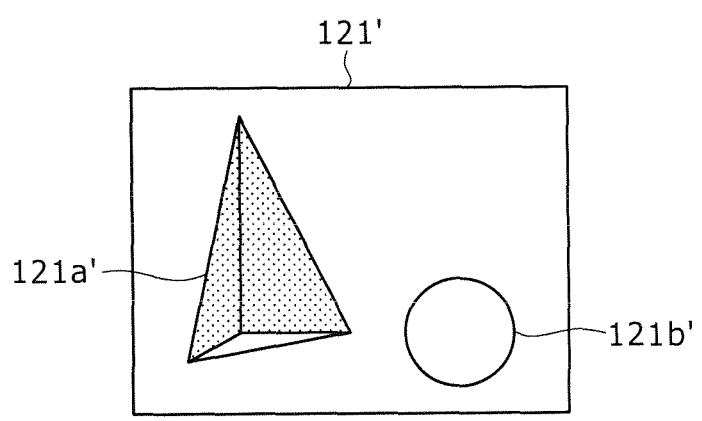

Referring to FIGS. 6A and 6B, there is shown an example of a behavior in which a CG image changes in response to a user's adjusting operation if a value indicative of a color of a material (or a surface of a polygon) is set as a parameter subject to adjustment. It should be noted that, of the materials, the color attribute is set in detail for each of diffuse reflection and self emission; however, for the brevity of description, the color attributes are generically referred to as "color of material."

FIG. 6A shows a CG image 121 in which polygons 121*a* and 121*b* are displayed as a CG image 121 before the adjustment of a parameter subject to adjustment.

FIG. 6B shows a CG image 121 in which polygons 121*a*' and 121*b*' having material colors different from those of the polygon 121*a* shown in FIG. 6A as the CG image 121' after the adjustment of the parameter subject to adjustment.

In response to a user's adjusting operation, the image generating block 67 adjusts the parameter subject to adjustment that is a value indicative of a material color of the polygon 121*a* so as to change the material color of the polygon 121*a*, thereby generating a CG image on the basis of the CG description data including the adjusted parameter subject to adjustment.

Consequently, the CG image generated by the image generating block 67 had changed to CG image 121' shown in FIG. 6B from the CG image 121 shown in FIG. 6A, for example.

Figure 7A:
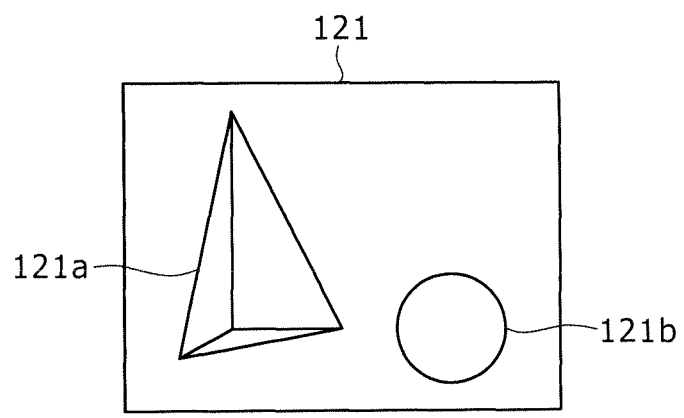
FIGS. 7A and 7B are diagrams illustrating exemplary manners of adjusting virtual camera positions.
Figure 7B:
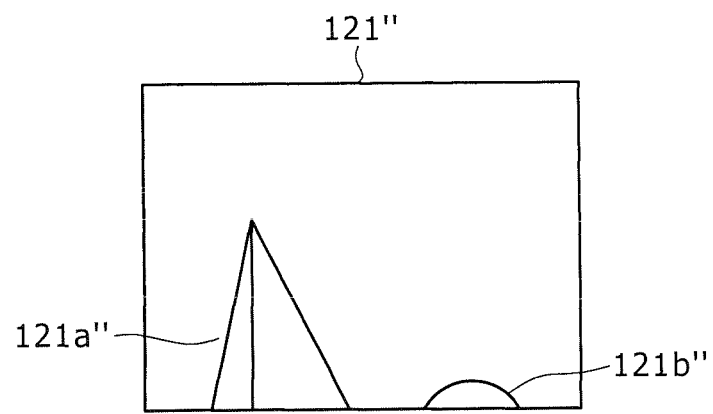

Referring to FIGS. 7A and 7B, there is shown an example of a behavior in which a CG image changes in response to a user's adjusting operation if position y of the three dimensional position (x, y, z) of a virtual camera is set as a parameter subject to adjustment. It should be noted that the y axis is representative of the upper direction relative to the screen being taken by the virtual camera.

FIG. 7A shows a CG image 121 in which polygons 121*a* and 121*b* are displayed as the CG image 121 before the adjustment of the parameter subject to adjustment.

FIG. 7B shows a CG image 121" in which polygons 121*a*" and 121*b*" are displayed that exist at a position different from the CG image 121 shown in FIG. 7A as the CG image 121" after the adjustment of the parameter subject to adjustment.

In response to a user's adjusting operation, the image generating block 67 adjusts the parameter subject to adjustment indicative of position y so as to increase position y of the virtual camera to generate a CG image on the basis of the CG description data including the adjusted parameter subject to adjustment.

Consequently, the CG image generated by the image generating block 67 has changed from the CG image 121 shown in FIG. 7A to the CG image 121" shown in FIG. 7B, for example. In the example shown above, the adjustment of only the positions of the virtual camera is described. It is also practicable to adjust the direction or rotational angle of the virtual camera, thereby moving the virtual camera in any manner in the virtual space of CG.

Generating Specification Information

Figure 8:
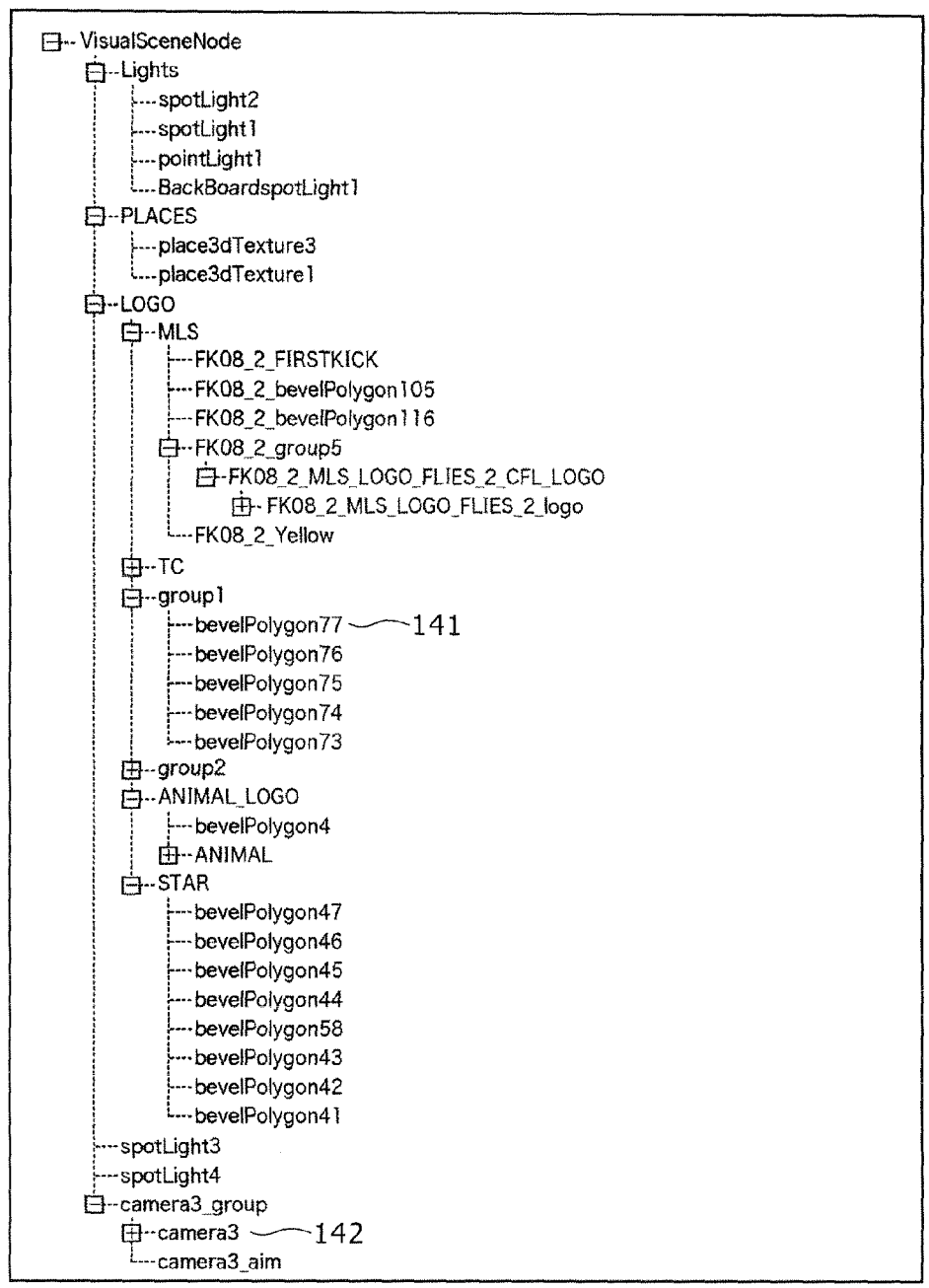
FIG. 8 is a diagram illustrating elements making up CG description data in a tree structure.

The following describes how to generate the specification information for specifying the value indicative of the material color of the polygon 121*a* as a parameter subject to adjustment and the specification information for specifying position y of the virtual camera as a parameter subject to adjustment with reference to FIG. 8.

FIG. 8 shows one example of a data structure display image to be displayed on the display block 24.

In the data structure display image shown in FIG. 8, the elements making up CG description data are displayed in a tree-shaped hierarchical structure. It should be noted that the hierarchical structure in the elements making up CG description data is not restricted to that shown in FIG. 8; namely, the CG creator can set the depth and so on of the hierarchical structure as desired.

"VisualSceneNode" shown in FIG. 8 shows a scene (or a CG virtual space). Shown below "VisualSceneNode" are element descriptors indicative of two or more elements that are arranged in the scene expressed by "VisualSceneNode."

To be more specific, such element descriptors are arranged below "VisualSceneNode" as "Light" indicative of the definition of two or more virtual lights for virtually projecting light to a CG object, "spotLight3" indicative of a virtual light arranged in the virtual space, "spotLight4" indicative of another virtual light arranged in the virtual space, and "PLACES" indicative of a subject of texture mapping arranged at a predetermined position, for example.

In addition, arranged below "VisualSceneNode" are element descriptors, such as "LOGO" indicative of a polyhedron that is a logo arranged in the scene and "camera3_group" indicative of two or more virtual cameras for virtually taking a CG object, for example.

Further, arranged below "LOGO" are element descriptors, such as "MLS," "TC," "group1," "group2," "ANIMAL_LOGO," and "STAR" for the element descriptors of the elements making up the logo represented by "LOGO," for example.

Below "MLS," "TC," "group1," "group2," "ANIMAL_LOGO," and "STAR," the element descriptors of the elements (polygon for example) making up the elements are arranged.

To be more specific, arranged below "group1" are "bevelPolygon77" 141, "bevelPolygon76," "bevelPolygon75," "bevelPolygon74," and "bevelPolygon73" indicative of polygons as the element descriptors of two or more elements making up "group1," for example.

Arranged below "camera3_group" are "camera3" 142 and "camera3_aim" indicative of a virtual camera as the element descriptors of two or more elements making up "camera3_group," for example.

Of the two or more pieces of CG description data stored in the CG description data storage block 63, the display control block 62 reads the CG description data specified by the user from the CG description data storage block 63. Next, on the basis of the CG description data thus read, the display control block 62 generates the data structure information indicative of the data structure of this CG description data and supplies the generated data structure information to the display block 24, thereby displaying the data structure display image as shown in FIG. 8 that corresponds to this data structure information.

Referencing the data structure display image shown on the display block 24, the user selects an element to be adjusted from among the elements making up the CG description data and executes a generating operation for generating the specification information about the selected element, for example.

To be more specific, if, through the operator panel 21, the user selects "bevelPolygon77" 141 shown on the display block 24 and executes a generating operation for generating the specification information about the polygon 121*a* represented by the selected "bevelPolygon77" 141, the operator panel 21 generates an operation signal corresponding to the user's generating operation and supplies the generated operation signal to the control block 61 of the CG image generating apparatus 23.

On the basis of the operation signal supplied from the operator panel 21, the control block 61 controls the specification information generating block 64 to execute the following processing.

To be more specific, under the control of the control block 61, the specification information generating block 64 presents to the user a parameters among two or more parameters for defining the polygon 121a indicated by the "bevelPolygon77" 141 as an option, generates the specification information for specifying the selected parameter as a parameter subject to adjustment, and stores the generated specification information in the specification information storage block 65, for example. It should be noted that, if a set of two or more pieces of specification information is created as a derived information file, the above mentioned operation is repeatedly executed to determine one derived information file.

For a specific example in which specification information is generated, the specification information generating block 64 generates the specification information for specifying, as the parameter subject to adjustment, a parameter indicative of a material color of the polygon 121a, as one parameter among two or more parameters for defining the polygon 121a, for example. This specification information is written as follows with the CG description data written by COLLADA as the target:

```
<rel element="material" rel_id="id2_Material">
  <rel element="phong">
    <rel element="emission">
      <rel element="color">
        <param_index>0</param_index>
      </rel>
    </rel>
    <rel element="ambient"><!-multi destination>
      <rel element="color">
        <param_index>0</param_index>
      </rel>
    </rel>
  </rel>
</rel>
```

In this example, R that is index zero, namely, red component is to be adjusted for the color information configured by RGB values. Also, in this example, the color of emission (self emission) and the color of ambient (ambient light) are to be adjusted at the same time.

It should be noted that, in addition to the specification of parameters subject to adjustment, the specification information generating block 64 generates the specification information for specifying a parameter operation ID for uniquely identifying the adjusting knob (or the joystick 44). Namely, the specification information includes the information for relating the adjusting knob 43 with a parameter subject to adjustment.

Further, in accordance with the user's generating operation, the specification information generating block 64 can generate the specification information that includes the following description, for example:

```
<param_scale>1.0</param_scale><!- option -->
<param_offset>0</param_offset><!- option -->
<param_type>float</param_type>
<param_curve>linear</param_curve>
<range>0 1.0</range><!-min, max-->
<volume_knob_type>B</volume_knob_type>
```

It should be noted that <param_scale>1.0</param_scale><!-option--> specifies that a multiplied value obtained by multiplying the adjustment value corresponding to the user's adjusting operation by value 1.0 is supplied from the control block 61 as the final adjustment value. <param_offset>0</param_offset><!-option--> specifies that an added value obtained by adding (or offsetting) value 0 to the adjustment value corresponding to the user's adjusting operation is supplied from the control block 61 as the final adjustment value.

Further, <param_type>float</param_type> specifies that the adjustment value corresponding to the user's adjusting operation is handled as float type (or a floating point type). Still further, <param_curve>linear</param_curve> specifies that the volume type of the adjusting knob 43 for adjusting a parameter subject to adjustment is set to the volume type that linearly changes as shown in FIG. 3A.

Moreover, <range>0 1.0</range><!-min,max--> specifies that the range of an adjustment value corresponding to the user's adjusting operation is from 0 to 1.0. Further, <volume_knob_type>B</volume_knob_type> specifies that the volume type of the adjusting knob 43 for adjusting a parameter subject to adjustment is set to the volume type shown in FIG. 3B.

It should be noted that, in the above-mentioned configuration, the specification information generating block 64 generates the specification information for specifying a parameter for every two or more parameters for defining the polygon 121a indicated by the "bevelPolygon77" 141 by user's generating operation. It is also practicable for the specification information generating block 64 to generate the specification information for specifying only the parameters specified by the user among the two or more parameters for defining the polygon 121a.

In this case, in response to the selection of the "bevelPolygon77" 141 by user's selecting operation, the display control block 62 displays, below the "bevelPolygon77" 141, a parameter indicative of material color of the polygon 121a, a parameter indicative of texture to be mapped to the polygon 121a, and a parameter indicative of three-dimensional position (x, y, z) of the polygon 121a as two or more parameters for defining the polygon 121a, for example.

Then, of the two or more parameters displayed below the "bevelPolygon77" 141, the specification information generating block 64 generates the specification information for specifying the parameter specified by the user.

It should be noted that the display control block 62 may display one or more attribute descriptors indicative of one or more attributes to be applied to any one of two or more elements arranged in a scene (or a CG virtual space). In this case, in response to the selection of a predetermined attribute descriptor by the user's selecting operation, the display control block 62 displays two or more parameters for defining the attribute descriptor selected by the user's selecting operation.

Next, of the two or more displayed parameters, the specification information generating block 64 can generate the specification information for specifying a parameter specified by the user's specifying operation as a parameter subject to adjustment.

Also, when generating the specification information for specifying position y of a virtual camera for virtually taking the polygons 121a and 121b as a parameter subject to adjustment, the user selects "camera3" 142 displayed on the display block 24 through the operator panel 21 and executes a generating operation for generating the specification information about the virtual camera indicated by the selected "camera3" 142, for example.

In response to the above-mentioned operation, the operator panel 21 generates an operation signal corresponding to the user's generating operation and supplies the generated operation signal to the control block 61 of the CG image generating apparatus 23. On the basis of the operation signal supplied from the operator panel 21, the control block 61 controls the specification information generating block 64 to execute the following processing.

Namely, for example, under the control of the control block 61, the specification information generating block 64 generates the specification information for specifying the parameter for defining a virtual camera indicated by element descriptor "camera3" 142 as the parameter subject to adjustment and stores the generated specification information into the specification information storage block 65.

To be more specific, the specification information generating block 64 generates the specification information for specifying, as the parameter subject to adjustment, a parameter indicative of position y of a virtual camera as one of the two or more parameters for defining the virtual camera, for example. This specification information is written as follows, for example:

```
<rel element="node" rel_id="Camera3"
instance="camera">
    <!--instance is optional -->
    <rel element="translate">
        <param_index>1</param_index><!--y-->
    </rel>
</rel>
<param_scale>1.0</param_scale><!--option -->
    <param_offset>0</param_offset><!--option -->
<param_type>float</param_type>
<param_relative>true</param_relative><!--option-->
```

In addition, the specification information generating block 64 can generate the following specification information, for example, as the specification information for specifying the three-dimensional position (x, y, z) of a virtual camera that is vector data as one parameter subject to adjustment:

```
<rel element="node" rel_id="Camera3
instance="camera">
    <rel element ="translate">
        <array_style>xyz</array_style>
    </rel>
</rel>
<param_scale>1.0 1.0 1.0</param_scale><!--option-->
<param_offset>0 0 0</param_offset><!--option-->
<range></range><!-min, max for each-->
```

It should be noted that, when specifying three-dimensional position (x, y, z) of a virtual camera as a parameter subject to adjustment, the three-dimensional position (x, y, z) as a parameter subject to change is handled as three floating point (or float type) values.

Further, the specification information generating block 64 can generate the specification information for specifying the parameter operation ID of the joystick 44 for example as the parameter operation ID of the operator block for adjusting a parameter subject to adjustment, for example. It is also applicable for the specification information generating block 64 to generate the specification information for specifying the parameter operation ID of the operator block for adjusting three-dimensional position (x, y, z) by directly entering the three dimensional position (x, y, z) along with the parameter operation ID of the joystick 44. Operating a rotary knob allows the adjustment of one value (or a scalar value) but operating means such as a joystick can handle (x, y, z) values (or make these values the subject of the specification information). Still further, it is practicable to for the specification information generating block 64 to include more values than (x, y, z) values in accordance with the function of operating means, namely, include the rotational angles these axes, for example, thereby handling the resultant data as one parameter subject to adjustment. The embodiment of the present invention allows the user to handle any sets of values according to the function of operating means and the user's requirements. For example, the user can specify a virtual camera and one of CG objects by one piece of specification information to manipulate the three-dimensional position, rotation, and zoom-in/zoom-out of the specified virtual camera and CG object. Namely, one piece of specification information allows the user to handle all of translate, rotation, and scale operations (so-called TRS operations). For the operating means for executing these operations, a button (namely, a delegation button) for selectively allocating the joystick and the function thereof to one of the TRS operation, for example, may be arranged to provide the operating means with which the user selectively operating the deletion button to operate the joystick.

About Animation

Figure 9:
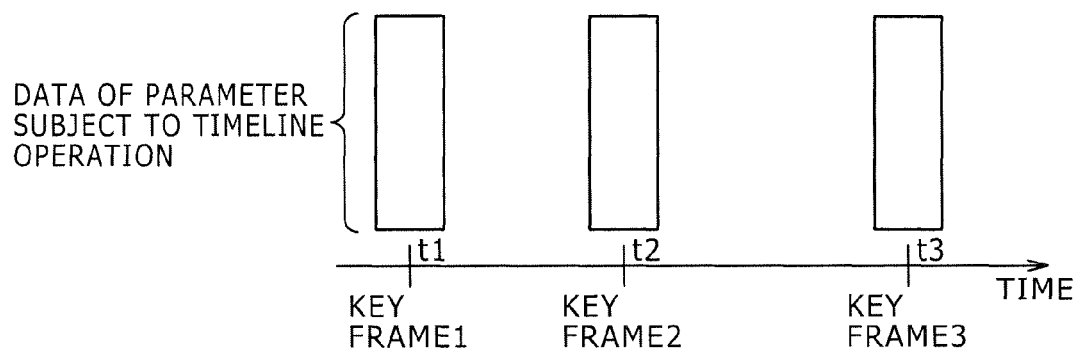
FIG. 9 is a diagram illustrating key frames.

The following describes the animation that is generated on the basis of CG description data with reference to FIG. 9.

FIG. 9 shows one example of a time line indicative of the reproduction times of an animation in a time dependent manner, the animation being configured by two or more CG images.

It should be noted that, in FIG. 9, the horizontal axis is representative of the animation reproduction time. Key frames 1, 2, and 3 are related with reproduction times t1, t2, and t3, respectively.

The key frame herein denotes data that includes a parameter (a parameter indicative of the three-dimensional position and so on of a polygon configuring a hero appearing in an animation, for example) for defining the an animation that is reproduced at a corresponding time. This key frame is written in CG description data.

When an animation corresponding to CG description data is reproduced, an action of the animation is determined on the basis of the key frame included in the CG description data. Namely, at reproduction times t1, t2, and t3, an action of the animation is determined on the basis of the parameter included in key frames 1, 2, and 3, respectively, for example.

It should be noted that, in a period from reproduction time t1 to reproduction time t2, there is no corresponding key frame; in this interval, an action of the animation is determined on the basis of a value resulted from the interpolation of key frames 1 and 2 that exist before and after this interval. This holds true with an interval from reproduction time t2 to reproduction time t3.

In response to the user's generating operation, the specification information generating block 64 can generate the specification information for specifying reproduction time t2 related with key frame 2 as the parameter subject to adjustment, for example.

Figure 10A:
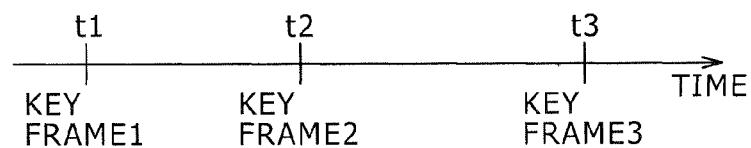
FIGS. 10A and 10B are diagrams illustrating exemplary manners in which reproduction times in key frames are adjusted.
Figure 10B:
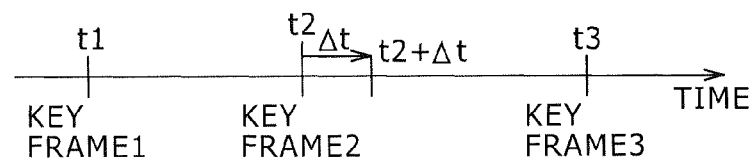

Consequently, on the basis of the specification information generated by the specification information generating block 64, the image generating block 67 can set reproduction time t2 related with key frame 2 to the parameter subject to adjustment and, in response to the user's adjusting operation, adjust reproduction time t2 shown in FIG. 10A to reproduction time t2+Δ2 shown in FIG. 10B, for example.

Operations of the CG Image Generating Apparatus 23

Figure 11:
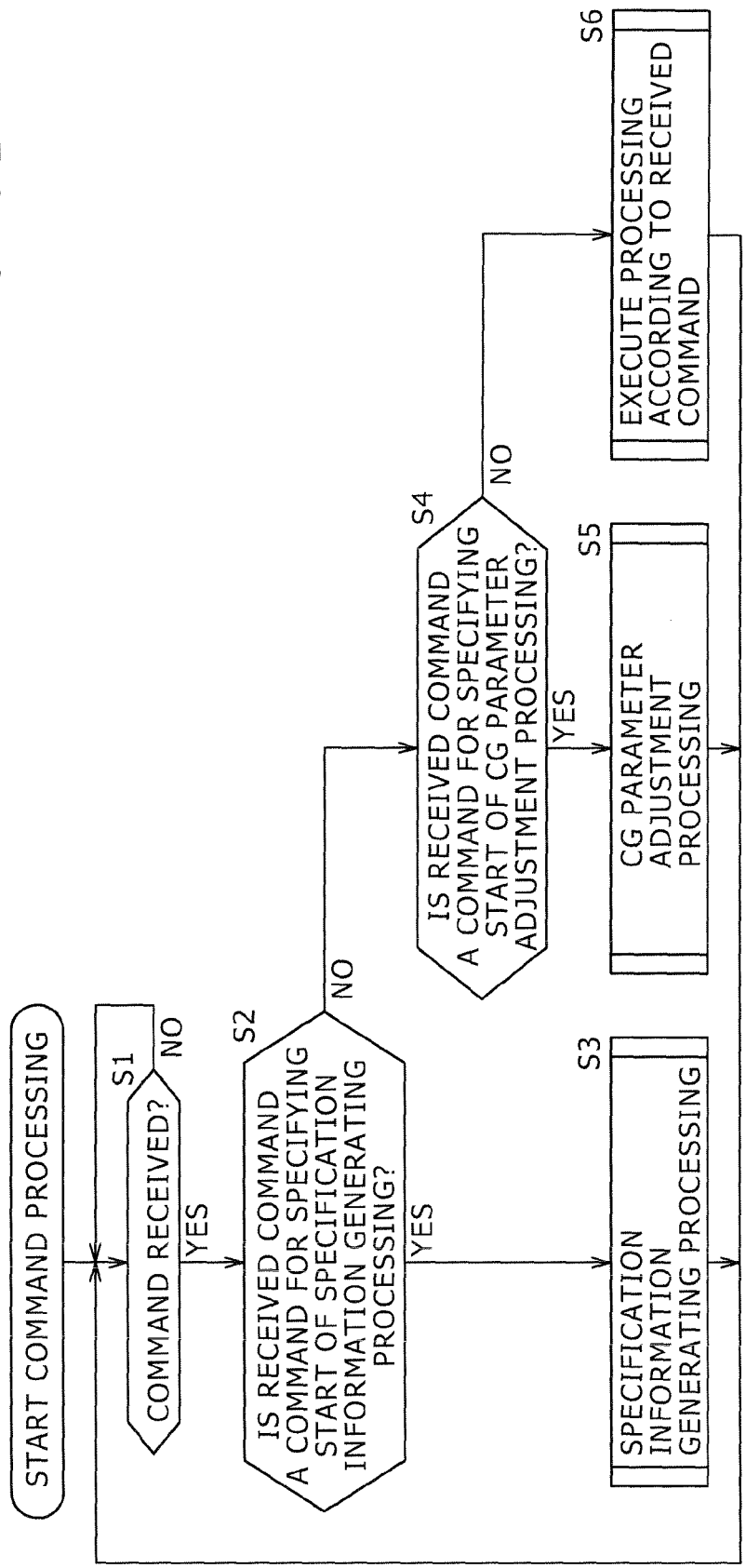
FIG. 11 is a flowchart indicative of command processing to be executed by the CG image generating apparatus.

The following describes command processing to be executed by the CG image generating apparatus 23 with reference to the flowchart shown in FIG. 11.

This command processing starts when one of the pieces of CG description data is found available in the CG image generating apparatus 23, for example. In response to a command issued from the operator panel 21, the CG image generating apparatus 23 changes operation modes. It is assumed here that an operation mode that is active when the CG image generating apparatus 23 is powered on be set to the initial mode.

In step S1, the control block 61 determines whether a command has been received from the operator panel 21. The control block 61 repeats the processing of step S1 until the reception of command is determined.

If a command is found received in step S1, then the procedure goes to step S2.

To be more specific, if, in response to an operation done by the user through the operator panel 21 for causing the CG image generating apparatus 23 to start predetermined processing, for example, a command corresponding to the user operation is supplied from the operator panel 21 to the control block 61, then the control block 61 determines that the command has been received from the operator panel 21, upon which the procedure goes to step S2.

In step S2, if, on the basis of the received command, the control block 61 determines that the received command is a command for commanding the start of specification information generating processing.

If, in step S2, the control block 61 determines on the basis of the received command that the received command is a command for commanding the start of specification information generating processing, then the control block 61 changes the operation mode of the CG image generating apparatus 23 to the specification information generating processing mode.

Then, if the user executes a selecting operation for selecting one of two or more pieces of CG description data stored in the CG description data storage block 63 through the operator panel 21, the operator panel 21 generates an operation signal corresponding to the user's selecting operation and supplies the generated operation signal to the control block 61, upon which the procedure goes to step S3.

In step S3, on the basis of the operation signal supplied from the operator panel 21, the control block 61 controls the display control block 62 and the specification information generating block 64 to execute the specification information generating processing for generating specification information and then returns to step S1 to repeat the above-mentioned processing therefrom. Details of the specification information generating processing in step S3 will be described later with reference to the flowchart shown in FIG. 12.

If, on the basis of the received command, the received command is found not to be a command for commanding the start of the specification information generating processing in step S2, then the procedure goes to step S4.

In step S4, the control block 61 determines on the basis of the received command whether the received command is a command for commanding the start of CG image generation. If the received command is found to be a command for commanding CG image generation, then the control block 61 changes the operation mode of the CG image generating apparatus 23 to the CG parameter adjustment processing mode.

Next, if the user operates the operator panel 21 so as to display a specification information list or a derived information file list onto the display block 42 of the operator panel 21, the operator panel 21 generates an operation signal corresponding to the user operation and supplies the generated operation signal to the control block 61, upon which the procedure goes to step S5.

In step S5, the control block 61 controls the load indication block 66 and the image generating block 67 on the basis of the operation signal supplied from the operator panel 21 to execute the CG parameter adjusting processing for generating a CG image, upon which the procedure is returned to step S1 to repeat the above-mentioned processing therefrom. Details of the CG parameter adjusting processing in step S5 will be described later with reference to the flowchart shown in FIG. 13.

If, on the basis of the received command, the received command is fount not to be a command for instructing the start of CG image generation in step S4, then the control block 61 changes the operation mode of the CG image generating apparatus 23 to the predetermined processing mode.

If the user executes an operation through the operator panel 21 to make the CG image generating apparatus 23 execute predetermined processing, then the operator panel 21 generates an operation signal corresponding to the user operation and supplies the generated operation signal to the control block 61, upon which the procedure goes to step S6.

In step S6, the control block 61 controls each of the functional blocks on the basis of the operation signal supplied from the operator panel 21 to execute predetermined processing, upon which the procedure is returned to step S1 to repeat the above-mentioned processing therefrom. It should be noted that the command processing is ended when the CG image generating apparatus 23 is powered off for example.

As described above, according to the command processing, the operation mode of the CG image generating apparatus 23 is changed in accordance with the command supplied from the operator panel 21. This configuration allows, if the operation mode is the CG parameter adjustment processing mode (the mode for generating a CG image), the prevention of the execution of the specification information generating processing due to a user operation error for example. Consequently, the above-mentioned configuration can prevent the specification information itself from being changed during the image generation along with the CG parameter adjusting processing, thereby preventing unexpected results from occurring.

Details of the Specification Information Generating Processing

Figure 12:
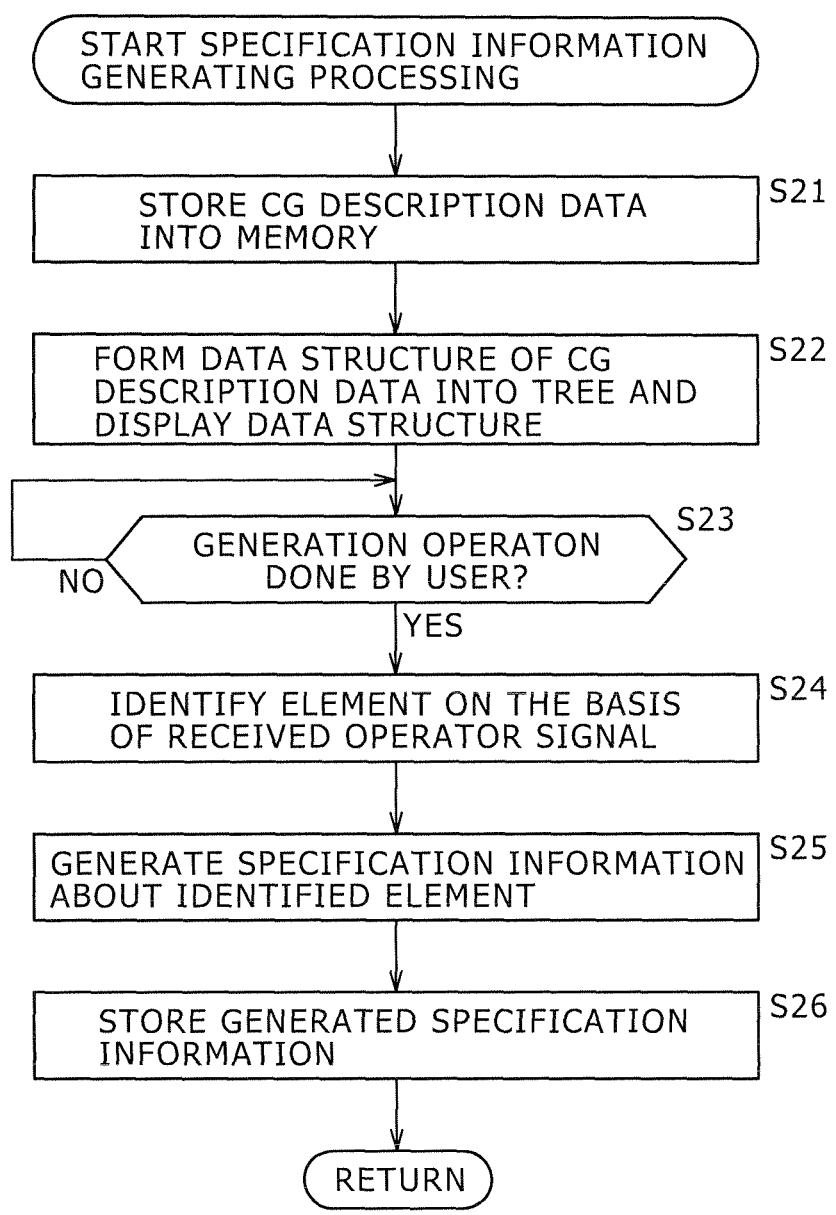
FIG. 12 is a flowchart indicative of specification information generating processing to be executed by the CG image generating apparatus.

The following describes details of the specification information generating processing done in step S3 shown in FIG. 11, with reference to the flowchart shown in FIG. 12.

In step S21, under the control of the control block 61, the specification information generating block 64 reads, from the CG description data storage block 63, the CG description data selected by a user's selecting operation among two or more pieces of CG description data stored in the CG description data storage block 63 and supplies the CG description data thus read into the memory 64a incorporated in the specification information generating block 64.

In step S22, under the control of the control block 61, the display control block 62 reads the CG description data selected by the user's selecting operation (namely, the CG description data stored in the memory 64a in step S21) from the CG description data storage block 63. Then, on the basis of the CG description data thus read, the display control block 62 generates the data structure information about this CG description data and supplies the generated data structure information to the display block 24, thereby displaying a corresponding data structure display image.

Consequently, on the basis of the data structure information supplied from the display control block 62, the display block 24 displays the data structure display image as shown in FIG. 8 (the image to be displayed with each element making up the CG description data as a tree-shaped hierarchical structure).

In step S23, the control block 61 determines on the basis of the operation signal supplied from the operator panel 21 whether the user's generating operation has been done or not. Until the user's generating operation is found done, the control block 61 repeats the processing of step S23.

If the user selects, through the operator panel 21, one of the elements making up the CG description data displayed on the display block 24, as a data structure display image, and executes a generating operation for generating the specification information about the selected element, then the operator panel 21 generates a operation signal corresponding to the user's generating operation and supplies the generated operation signal to the control block 61.

In response, the control block 61 determines, in step S23, on the basis of the operation signal supplied from the control block 61, that the generating operation has been done, upon which the procedure goes to step S24.

In step S24, under the control of the control block 61, the specification information generating block 64 identifies the element selected by the user and one or more parameters for defining the element selected by the user from among the elements making up the CG description data stored in the memory 64a.

In step S25, the specification information generating block 64 generates the specification information for specifying the selected parameter as a parameter subject to adjustment.

In step S26, the specification information generating block 64 stores the generated specification information into the specification information storage block 65, upon which the procedure is returned to step S3 to repeat the above-mentioned processing therefrom. It should be noted that, if two or more pieces of specification information are handled as one derived information file, then the generation of the specification information is repeated for every derived information file. The identifier of the CG description data stored in the memory 64a is written in the derived information file.

In the specification information generating processing described above, the elements making up the CG description data are displayed on the display block 24 in a tree-shaped hierarchical structure, so that the user can easily select, from among the displayed elements, desired elements for which the generation of the specification information is desired. Hence, the user can easily generate the specification information about the elements for which the generation of the specification information is desired.

Further, if, in the specification information generating processing, the specification information for specifying a parameter operation ID such that the arrangement of the adjusting knob 43 for example that the user can adjust with ease is provided, then, in the CG parameter adjusting processing, the user can adjust the parameter subject to adjustment with the adjusting knob 43 arranged for easy adjustment by the user on the operator panel 21.

Details of the CG Parameter Adjusting Processing

Figure 13:
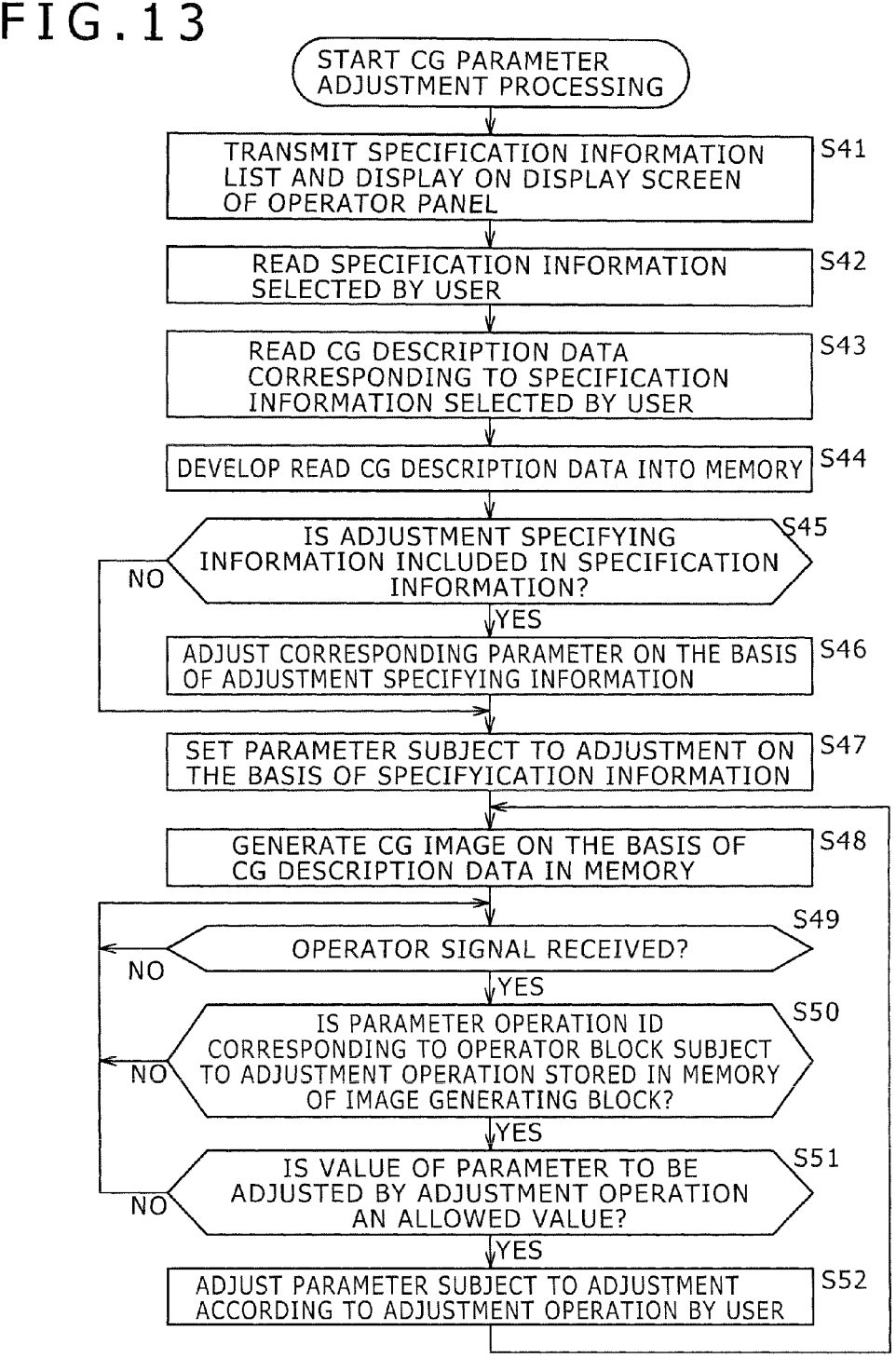
FIG. 13 is a flowchart indicative of CG parameter adjusting processing to be executed by the CG image generating apparatus.

The following describes details of the CG image generating processing and the CG parameter adjusting processing in step S5 shown in FIG. 11 with reference to the flowchart shown in FIG. 13.

In step S41, in response to the operation signal supplied from the operator panel 21, the control block 61 reads a specification information list from the specification information storage block 65 or gets a generated specification information list and supplies the specification information list to the operator panel 21. In response, the operator panel 21 displays the specification information list and so on supplied from the control block 61 onto the display block 42 of the operator panel 21. It should be noted that, in the configuration based on the derived information file, not the specification information list but the derived information file list is read and displayed.

Referencing the specification information list and so on displayed on the display block 42 of the operator panel 21, the user executes a selecting operation for selecting any one of two or more pieces of specification information displayed as the specification information list, through the operation button 41 of the operator panel 21. Alternatively, the user executes an operation of selecting any one of the derived information files.

In this case, operator panel 21 generates an operation signal corresponding to the user's selecting operation and supplies the generated operation signal to the control block 61.

In step S42, in response to the operation signal supplied from the operator panel 21, the control block 61 controls the load indication block 66. Under the control of the control block 61, the load indication block 66 reads the specification information or the derived information file selected by the user's selecting operation from the specification information storage block 65 and supplies the specification information or the derived information file thus read to the image generating block 67.

In step S43, of the two or more pieces of CG description data stored in the CG description data storage block 63, the load indication block 66 reads, from the CG description data storage block 63, the CG description data identified by the identifier included in the specification information or the derived information file read from the specification information storage block 65.

Next, in step S44, the load indication block 66 supplies the CG description data thus read to the image generating block 67 to store the CG description data into the memory 67a.

In step S45, the image generating block 67 determines on the basis of the specification information supplied from the load indication block 66 whether adjustment indication information (or parameter value indication information) is included in this specification information. If adjustment indication information is found included in the specification information, then the procedure goes to step S46.

In step S46, on the basis of the adjustment indication information included in the specification information supplied from the load indication block 66, the image generating block 67 writes the value of a parameter (a parameter subject to adjustment and so on) with a value indicated by the adjustment indication information, of the two or more parameters included in the CG description data stored in the memory 67a.

If, in step S45, the image generating block 67 determines on the basis of the specification information supplied from the load indication block 66 that no adjustment indication information is included in that specification information, then step S46 is skipped and the procedure goes to step S47.

In step S47, of the two or more parameters included in the CG description data stored in the memory 67a, the image generating block 67 sets the parameter specified by the specification information supplied from the load indication block 66 to a parameter subject to adjustment.

Also, the image generating block 67 relates the parameter operation ID specified by the specification information supplied from the load indication block 66 with the parameter subject to adjustment and stores the related parameter operation ID and parameter subject to adjustment into the memory 67a. It should be noted that, in this case, the specification information specifies at least the a parameter subject to adjustment and a parameter operation ID.

In step S48, the image generating block 67 generates a corresponding CG image on the basis of the CG description data stored in the memory 67a and supplies the generated CG image to the display control block 62 to display the CG image on the display block 24.

Next, the user references the CG image displayed on the display block 24 and executes an adjusting operation for adjusting the parameter subject to adjustment by use of the adjusting knob 43 and the joystick 44, for example of the operator panel 21 as required. In this case, the operator panel 21 generates an operation signal corresponding to the user's adjusting operation and supplies the generated operation signal to the control block 61.

In step S49, the control block 61 determines whether the operation signal has been supplied from the operator panel 21.

To be more specific, the control block 61 repeats the processing of step S49 until the operation signal is supplied from the operator panel 21. However, with a system in which image generation is executed on a frame basis of on a field basis, the image generation of a following frame or field is executed in synchronization with a VD signal, so that the procedure must be returned to step S48.

Next, if the operation signal is found supplied from the operator panel 21, then the control block 61 makes the procedure go to step S50 to supply the operation signal supplied from the operator panel 21 to the image generating block 67, thereby executing the following processing.

To be more specific, in step S50, under the control of the control block 61, the image generating block 67 determines on the basis of the operation signal supplied from the control block 61 whether the parameter operation ID included in the operation signal supplied from the control block 61 is stored in the memory 67a. In other words, the image generating block 67 determines whether this parameter operation ID is set as a parameter subject to adjustment.

It should be noted that the operation signal to be supplied from the operator panel 21 to the control block 61 in response to the user's adjusting operation includes the parameter operation ID of the operator block through which the user has executed the adjusting operation and the adjustment value corresponding to the user's adjusting operation.

If, in step S50, the parameter operation ID included in the operation signal supplied from the control block 61 is found not stored in the memory 67a, then the image generating block 67 returns the procedure to step S49 to repeat the above-mentioned processing therefrom.

If, in step S50, the parameter operation ID included in the operation signal supplied from the control block 61 is found stored in the memory 67a, then the image generating block 67 moves the procedure to step S51.

In step S51, under the control of the control block 61, the image generating block 67 determines whether the adjustment value included in the operation signal supplied from the control block 61 is a value within a predetermine allowance range.

If, in step S51, the adjustment value included in the operation signal supplied from the control block 61 is found not within a predetermined allowance range, then the image generating block 67 returns the procedure to step S49 to repeat the above-mentioned processing therefrom.

If, in step S51, the adjustment value included in the operation signal supplied from the control block 61 is found within a predetermined allowance range, then the image generating block 67 moves the procedure to step S52.

In step S52, under the control of the control block 61, the image generating block 67 adjusts, of the parameters subject to adjustment stored in the memory 67a, the parameter subject to adjustment related with the parameter operation ID included in the operation signal supplied from the control block 61 to the adjustment value included in the operation signal supplied from the control block 61 and the returns the procedure to step S48. It should be noted that, in the adjustment based on the received adjustment value, the adjustment value may be an immediate value or a value (namely, a difference) that is applied by adding this value to a current value. Also, the adjustment value may be used after executing conversion, such as multiplication or addition, on the received adjustment value.

In step S48, the image generating block 67 generates a corresponding CG image on the basis of the CG description data with the parameter subject to adjustment adjusted and stored in the memory 67a and displays the generated CG image on the display block 24 of the display control block 62, subsequently executing the same processing as described above. As a result, the CG image with the adjustment operation reflected is supplied to the switcher 25 for every frame or field.

Next, in the switcher 25, a synthesized image obtained by synthesizing the CG image supplied from the image generating block 67 with an image subject to synthesis is outputted.

As described above, in the CG parameter adjusting processing, the parameter subject to adjustment specified by the specification information can be adjusted (or changed) in accordance with the user's adjusting operation done through the adjusting knob 43 or the joystick 44 of the operator panel 21.

Hence, in the CG parameter adjusting processing, only adjusting the parameter subject to adjustment in response to a user's adjusting operation in CG image synthesis processing allows the user to easily manipulate a CG image. Therefore, this CG parameter adjusting processing allows faster and less costly CG image manipulation than the CG image manipulation done by a CG image creator. In addition, this CG parameter adjusting processing allows the instant changing of CG in accordance with the contents of an image handled by the switcher 25, so that the CG suited to the contents of the image can be generated, thereby increasing the value of the results of the synthesis obtained by the switcher 25.

Further, in the CG parameter adjusting processing, a CG image provides a CG image that can be manipulated with ease, thus resulting in a CG image valued higher than CG images that cannot be manipulated.

Moreover, in the CG parameter adjusting processing, a desired parameter can be specified as a parameter subject to adjustment in accordance with a user operation, so that the user can set those parameters which must be adjusted to parameters subject to adjustment for different aims.

Further, in the CG parameter adjustment processing, the adjusting knob 43 and so on for adjusting a parameter subject to adjustment is specified by the specification information and the adjustment is executed by the use of the specified adjusting knob 43 and so on, for example.

Therefore, the adjusting knob 43 and so on for adjusting many different parameters subject to adjustment need not be arranged for difference pieces of CG description data, for example. This reduces the number of adjusting knobs 43, so that adjusting knobs 43 that are easy to operate, durable, and therefore comparatively expensive may be employed for the adjusting knob 43 of the operator panel 21.

Operation of the Operator Panel 21

Figure 14:
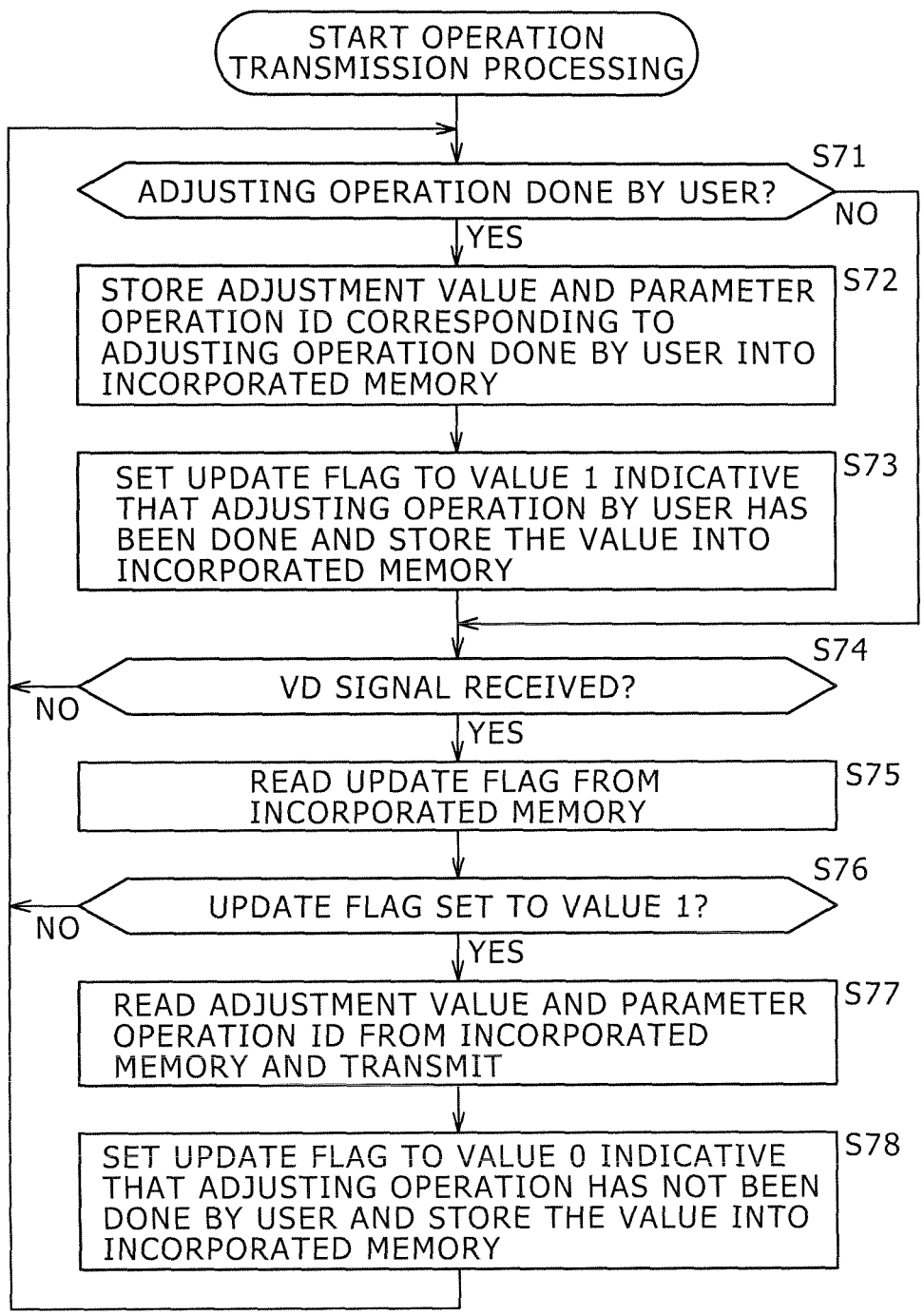
FIG. 14 is a flowchart indicative of operation transmitting processing to be executed by the operator panel.

The following describes operation transmitting processing to be executed by the operator panel 21 with reference to the flowchart shown in FIG. 14.

This operation transmitting operation starts when the user executes an adjusting operation for adjusting a parameter subject to adjustment through the operator panel 21.

In step S71, the operator panel 21 determines whether an adjusting operation has been executed by the user on the basis of whether the adjusting knob 43 or the like of the operator panel 21 has been operated or not. If an adjusting operation by the user is found executed, then the procedure goes to step S72.

In step S72, the operator panel 21 generates an operation signal that corresponds to the user's adjusting operation and includes an adjustment value corresponding to the user's adjusting operation and a parameter operation ID corresponding to the operator block through which the adjusting operation has been executed and stores the generated operation signal into the memory 21a.

In step S73, the operator panel 21 sets an update flag stored in the memory 21a in advance to value 1 that is indicative that the user's adjusting operation has been executed. It should be noted that the update flag is set to value 0 in advance, indicating that no adjusting operation has been executed by the user.

If the user's adjusting operation is found not executed in step S71 according to whether the operation of the adjusting knob 43 or the like of the operator panel 21 has been done, then the operator panel 21 moves the procedure to step S74.

In step S74, the operator panel 21 determines whether a VD signal has been received from the control block 61. If no VD signal is found received, then the operator panel 21 returns the procedure to step S71 to repeat the above-mentioned processing therefrom.

If a VD signal is found received from the control block 61 in step S74, then the operator panel 21 moves the procedure to step S75. In step S75, the operator panel 21 reads the update flag from the memory 21a.

In step S76, the operator panel 21 determines whether the user's adjusting operation has been executed on the basis of the update flag read from the memory 21a. Namely, if the update flag read from the operator panel 21 is set to value 0, the operator panel 21 determines that no user's adjusting operation has been executed and returns the procedure to step S71 to repeat the above-mentioned processing therefrom.

If the update flag read from the memory 21a is set to value 1, then the operator panel 21 determines that the user's adjusting operation has been executed, moving the procedure to step S77, for example.

In step S77, the operator panel 21 reads the operation signal including the adjustment value and the parameter operation ID from the memory 21a and supplies the adjustment value the parameter operation ID to the control block 61.

In step S78, the operator panel 21 changes the update flag stored in the memory 21a to value 0 indicative that no user's adjusting operation has been executed and returns the procedure to step S71 to repeat the above-mentioned processing therefrom. Subsequently, the operator panel 21 executes the same processing as described above. It should be noted that, in the description done above, the procedure was returned to step S71 if no VD signal had been found in step S74. It is also practicable for the operator panel 21 to wait (doing nothing) the reception of the VD signal in step S74 without executing the return procedure. Namely, the determination whether the user's adjusting operation has been executed or not may be executed every time a VD signal is received.

Processing by the Operator Panel 21 and the Image Generating Block 67

Figure 15:
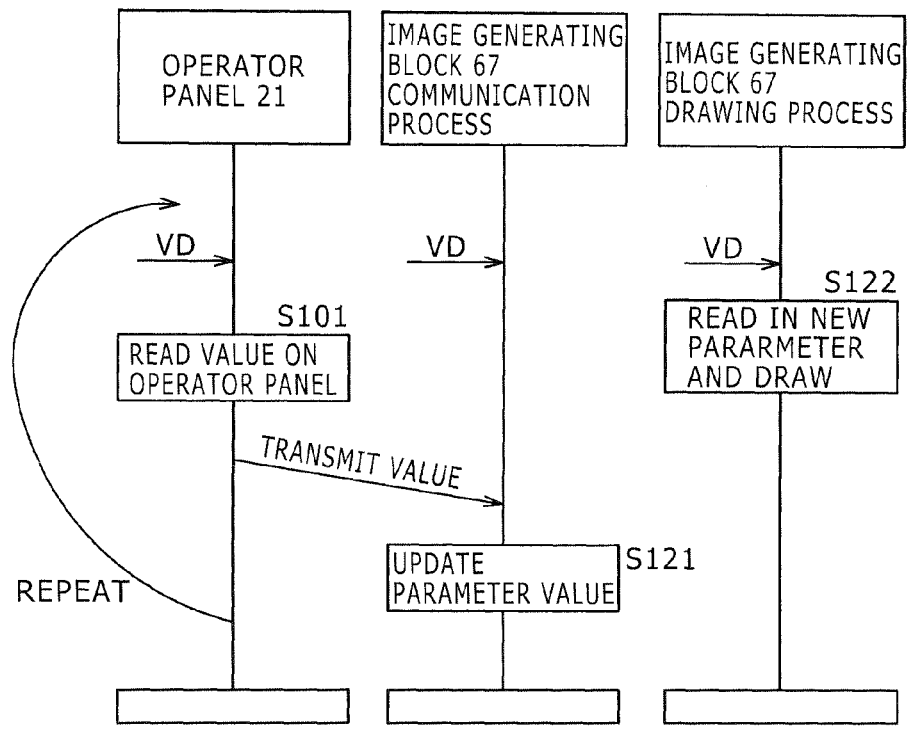
FIG. 15 is a sequence chart indicative of exemplary processing operations of the operator panel and a image generating block to be executed every time a VD signal is supplied.

The following describes processing operations of step S48 through step S52 in the operation transmitting processing to be executed by the operator panel 21 and the CG parameter adjusting processing to be executed by the image generating block 67 when a VD signal is supplied from the control block 61 of the CG image generating apparatus 23, with reference to the sequence chart shown in FIG. 15.

As shown in FIG. 15, in step S101, the operator panel 21 reads an update flag from the memory 21a every time a VD signal is supplied from the control block 61 of the CG image generating apparatus 23.

If the update flag is found set to value 1, the operator panel 21 reads the operation signal including an adjustment value and a parameter operation ID from the memory 21a and supplies the operation signal thus read to the control block 61.

In step S49, the control block 61 determines whether the operation signal has been supplied from the operator panel 21. If the operation signal is found supplied from the operator panel 21, then the control block 61 supplies the adjustment and the parameter operation ID included in the operation signal supplied from the operator panel 21 to the image generating block 67.

Next, on the basis of the operation signal supplied from the operator panel 21, the control block 61 controls the image generating block 67 to execute the processing operations of step S50 through step S52 in the CG parameter adjusting processing described above.

Namely, for example, the image generating block 67 executes the processing operations of step S50 and step S51 on the basis of the adjustment value and the parameter operation ID supplied from the control block 61 every time a VD signal is supplied from the control block 61.

Next, when the procedure goes from step S51 to step S52, the image generating block 67 adjusts the value of the parameter subject to adjustment stored in the memory 67a to the received adjustment value as shown in step S121.

Then, when the procedure returns from step S52 to step S48, the image generating block 67 generates a corresponding CG image on the basis of the CG description data stored in the memory 67a when a VD signal is supplied from the control block 61 as shown in step S122 and supplies the generated CG image to the display control block 62 to display the CG image on the display block 24.

As described above, the image generating block 67 of the operator panel 21 executes the processing on a frame basis or a field basis every time a VD signal is supplied from the control block 61.

Figure 16:
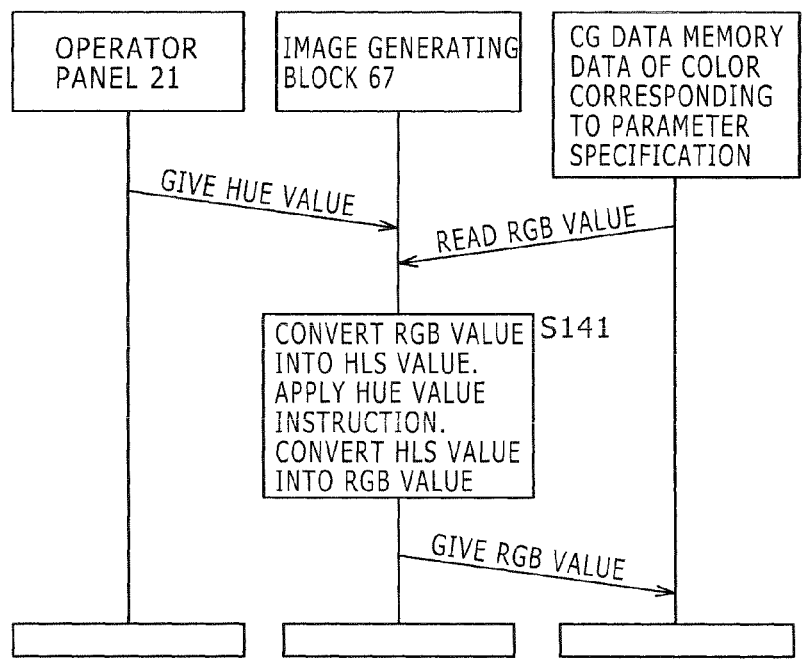
FIG. 16 is a sequence chart indicative of conversion processing to be executed by the image generating block.

If an H value indicative of hue is supplied as an adjustment value included in an operation signal supplied from the operator panel 21 as shown in FIG. 16, then the image generating block 67 converts the H value as an adjustment value to RGB (Red, Green, Blue) values. Namely, the image generating block 67 converts the current RGB values to an HLS (Hue, Luminance, Saturation) value, applies the received H value to the HLS value to return the HLS value to the RGB values, applying the resultant RGB value. This holds the same if the L value indicative of luminance and the S value indicative of saturation are supplied as the adjustment value.

It should be noted that, not RGB values, but at least one of H value, L value, and S value is supplied to the control block 61 as the adjustment value included in each operation signal supplied from the operator panel 21. The reason for this is as follows.

To be more specific, when the user executes color adjustment, the adjustment by hue, luminance, and saturation is intuitively easier to adjust as compared with the adjustment by RGB values, so that, in the present embodiment, in the adjustment of material color and the like, the user execute color adjustment on the basis of hue, luminance, and saturation through the operator panel 21.

It should be noted that it is also practicable for the operator panel 21 to convert the H value, L value, and S value adjusted by the user into RGB values and supply the resultant RGB values to the control block 61. In this case, however, the operator panel 21 must supply the three values R, B, and B making up the RGB values to the control block 61, which increases the data transmission volume between the operator panel 21 and the control block 61.

In order to prevent the above-mentioned data transmission volume from increasing, the present embodiment converts H value, L value, and S value into RGB values not in the operator panel 21 but in the image generating block 67.

Meanwhile, the specification information for specifying H value as a parameter subject to adjustment is written as follows, for example:

```
<rel element="emission">
    <rel element="color">
        <color_ctrl>hue</color_ctrl><!--hue, lum, sat-->
    </rel>
</rel>
```

To be more specific, the use of hue (H) value for control is written in the specification information in advance.

It should be noted that H value is a cyclic value indicating hue in angle 0 degree to angle 360 degrees. In one coding example, if the angle of hue is 0 degree (or 360 degrees), the H value is 0x0000; if the angle of hue is 90 degrees, the H value is 0x4000. Further, if the angle of hue is 180 degrees, the H value is 0x8000; if the angle of hue is 270 degrees, the H value is 0xc000.

This H value is adjusted with the adjusting knob 43 or the like set to the volume type shown in FIG. 3A, for example.

S value is a non-cyclic value indicative of saturation in 0 to 1 (0 to 100[ ]). In one coding example, if saturation is 0, then S value is 0x0000; if saturation is 1, then S value is 0x7fff. This S value is adjusted with the adjusting knob 43 or the like set to the volume type shown in FIG. 3C, for example.

Further, L value is a non-cyclic value indicative of luminance in 0 to 1 (0 to 100[ ]). In one coding example, if luminance is 0, L value is 0x0000; if luminance is 1, L value is 0x7fff. This L value is adjusted with the adjusting knob 43 or the like set to the volume type shown in FIG. 3C.

In the above description, the means of color adjustment in which each of the HSL values is adjusted with the knob has been explained. For example, a color pallet may be displayed on GUI (Graphical User Interface) to provide the user with the visual selection, transmitting the input of an operation done by the user as an operation signal.

It is also practicable to transmit the color information before adjustment from the CG image generating apparatus to operator means (GUI or the like), allowing the user to recognize the current value before adjusting the color information.

Key Frame Update Processing by the CG Image Generating Apparatus 23

Figure 17:
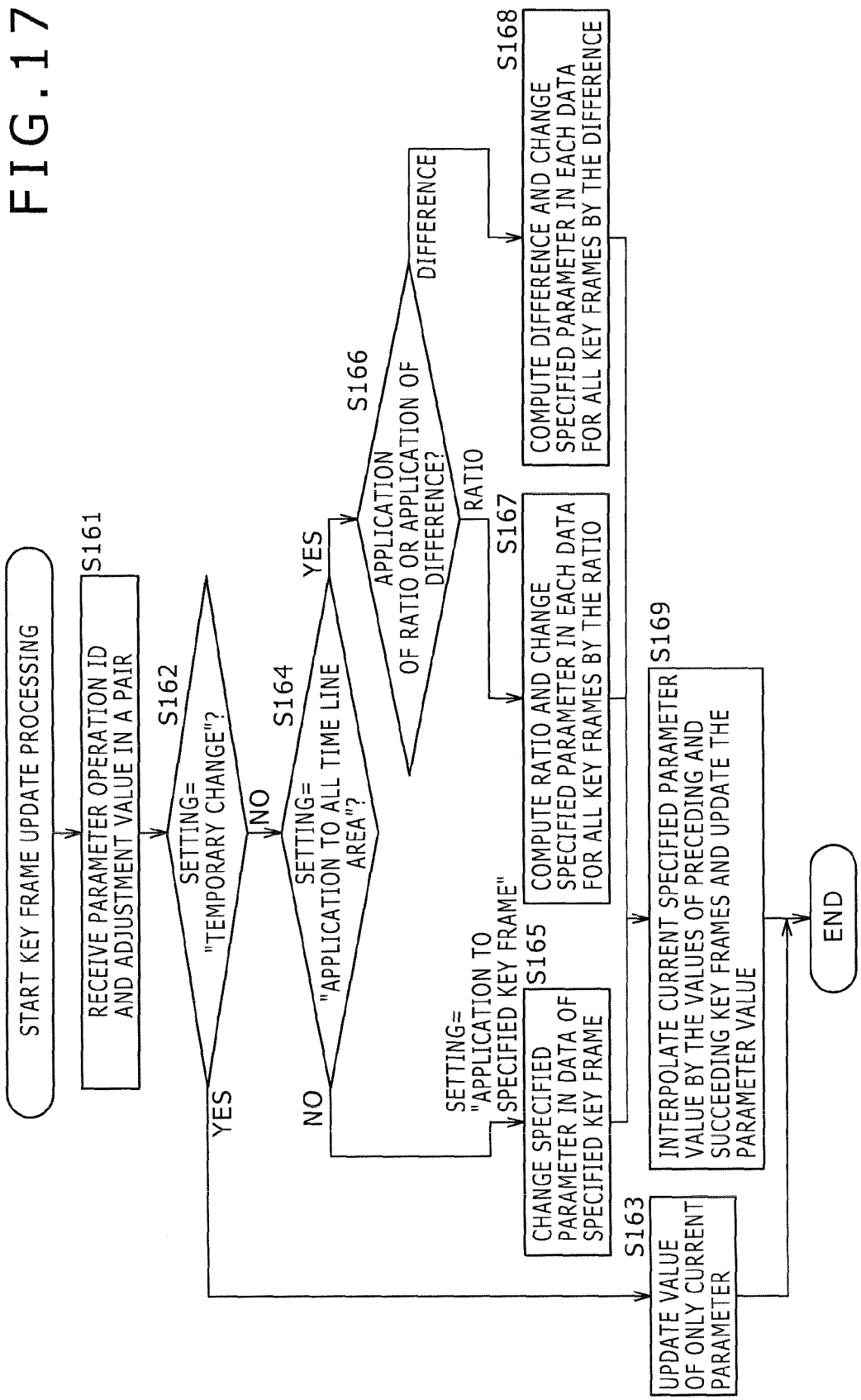
FIG. 17 is a flowchart indicative of key frame update processing to be executed by the CG image generating apparatus.

Referring to FIG. 17, the following describes key frame update processing for changing key frames by adjusting, through user's adjusting operation, a parameter subject to adjustment of the two or more parameters included in a key frame. This processing is applicable if key frame animation description is included in CG description data.

In step S161, the control block 61 receives an operation signal from the operator panel 21. It should be noted that this operation signal includes a parameter operation ID of an operator block through which the user's adjusting operation has been made and an adjustment value corresponding to the user's adjusting operation.

In step S162, the control block 61 determines on the basis of the operation signal supplied from the operator panel 21 whether the adjustment by the user's adjusting operation is temporary or not, namely, whether only the parameter subject to adjustment stored in the memory 67a is adjusted or the adjustment of the parameter subject to adjustment stored in the memory 67a is reflected onto animation or not.

If the adjustment by the user's adjusting operation is found to be temporary on the basis of the operation signal supplied from the operator panel 21, then the control block 61 moves the procedure to step S163. Then, the control block 61 controls the image generating block 67 to execute the processing of step S163.

In step S163, under the control of the control block 61, the image generating block 67 adjust parameter x stored in the memory 67a to x+Δx for example by using parameter x as the adjustment value corresponding to the user's adjusting operation.

In step S162, if the adjustment by the user's adjusting operation is fount not to be temporary on the basis of the operation signal supplied from the operator panel 21, then the control block 61 moves the procedure to step S164.

In step S164, the control block 61 determines on the basis of the operation signal supplied from the operator panel 21 whether the adjustment by the user's adjusting operation is applicable to all time line range. If the adjustment is found to be not applicable to all time line range, then the control block 61 moves the procedure to step S165. Then, the control block 61 controls the image generating block 67 to execute the processing of step S165.

In step S165, under the control of the control block 61, the image generating block 67 adjusts parameter x subject to adjustment stored in the memory 67a to adjustment value x+Δx corresponding to the user's adjusting value and stores the adjustment value x+Δx as the value of a parameter subject to adjustment in a specified key frame, upon which the procedure goes to step S169.

If, in step S164, the adjustment done by the user's adjusting operation is found to be the application to the entire time line range on the basis of the operation signal supplied from the operator panel 21, then the control block 61 moves the procedure to step S166.

In step S166, the control block 61 determines on the basis of the operation signal supplied from the operator panel 21 whether to apply, on the basis of ratio or on the basis of difference, the adjustment by the user's adjusting operation to key frames (key frames 1 and 3 shown in FIG. 9 for example) other than the key frame (key frame 2 shown in FIG. 9 for example) including the parameter subject to adjustment among two or more key frames (key frames 1 through 3 shown in FIG. 9 for example) related with the entire time line range.

If, in step S166, on the basis of the operation signal supplied from the operator panel 21, the adjustment by the user's adjusting operation is found to be applied on the basis of ratio, then the control block 61 moves the procedure to step S167. Then, the control block 61 controls the image generating block 67 to execute the processing of step S167.

In step S167, under the control of the control block 61, the image generating block 67 adjusts value x of the parameter subject to adjustment to adjustment value x+Δx.

In addition, the image generating block 67 computes ratio $(x+\Delta x)/x$ between value x of the parameter subject to adjustment and adjustment value $x+\Delta x$. Then, the image generating block 67 adjusts value y of the parameter of each of other key frames (key frames 1 and 3 shown in FIG. 9 for example) corresponding to the parameter subject to adjustment to value $y\{(x+\Delta x)/x\}$ obtained by multiplication between value y and ratio $(x+\Delta x)/x$, upon which the procedure goes to step S169.

If, In step S166, on the basis of the operation signal supplied from the operator panel 21, the adjustment by the user's adjusting operation is found to be applied on the basis of difference, then the control block 61 moves the procedure to step S168. Then, the control block 61 controls the image generating block 67 to execute the processing of step S168.

In step S168, under the control of the control block 61, the image generating block 67 adjusts value x of the parameter subject to adjustment to adjustment value $x+\Delta x$.

Further, the image generating block 67 computes difference $\Delta x$ ($=x+\Delta x-x$) between adjustment value $x+\Delta x$ and value x of the parameter subject to adjustment. Next, the image generating block 67 adjusts value y of the parameter of each of other key frames (key frames 1 and 3 shown in FIG. 9 for example) corresponding to the parameter subject to adjustment to $y+\Delta x$ obtained by adding value y to difference $\Delta x$, upon which the procedure goes to step S169.

In step S169, on the basis of the adjusted key frame, the image generating block 67 updates the value of the parameter about the reproduction time not related with the key frame by interpolating the preceding and succeeding key frames. Here, the key frame update processing comes to an end.

As described above, according to the key frame update processing, the adjustment by a user's adjusting operation can be applied to the entire time line range as shown in step S168, so that adjusting only one key frame allows the adjustment of other key frames. Hence, this configuration saves the trouble of adjustment by executing a user's adjusting operation for each key frame.

It is also practicable to set "temporary change," "application to the entire time line range," "application of ratio," or "application of difference" in advance by a user operation and store the setting in a dedicated memory area or include in an operation signal supplied from the operator panel.

Processing by the Operator Panel 21 and the Image Generating Block 67

Figure 18:
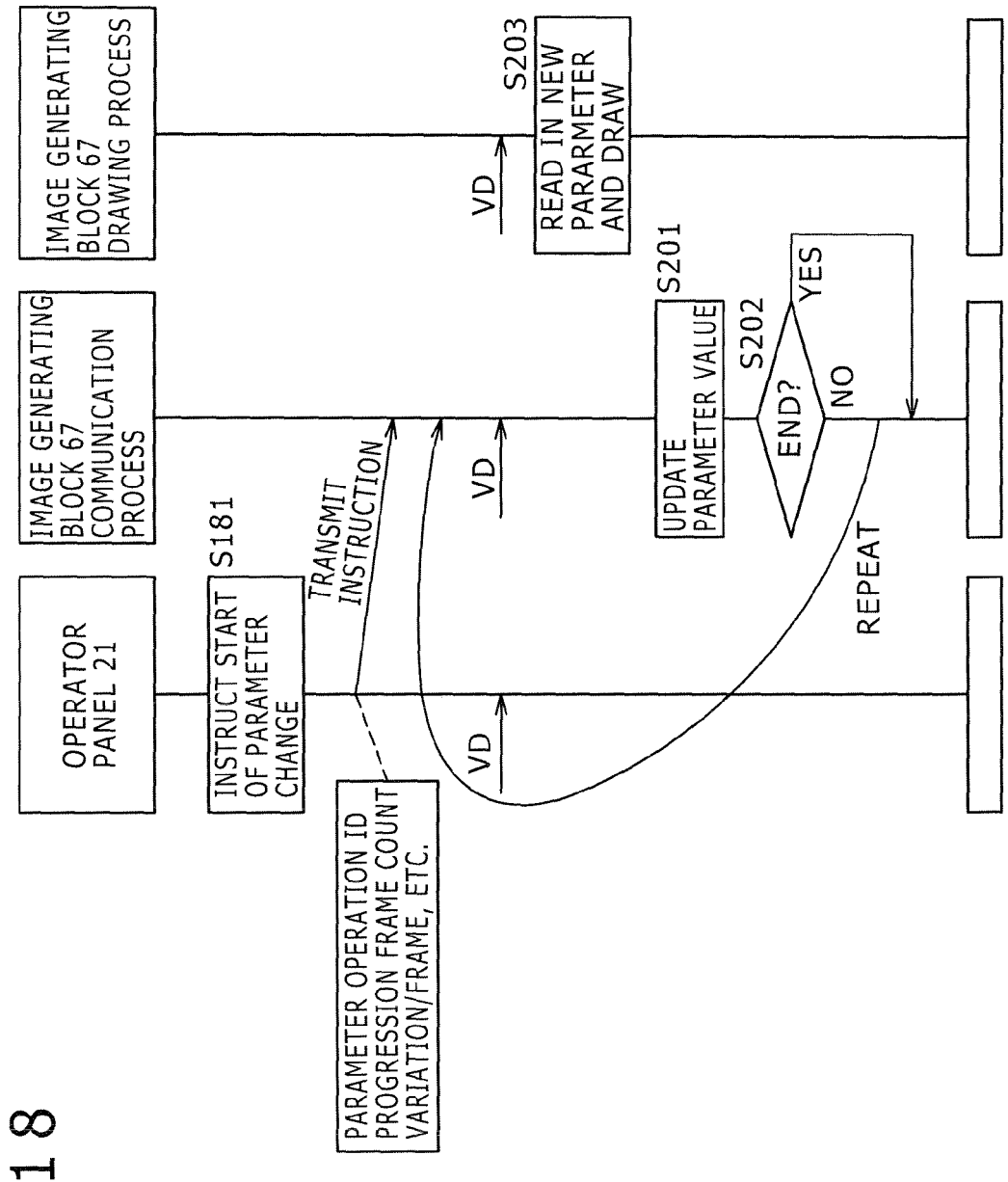
FIG. 18 is a sequence chart indicative of other exemplary processing operations of the operator panel and a image generating block to be executed every time a VD signal is supplied.

The sequence chart shown in FIG. 18 illustrates another example of processing that is executed by the operator panel 21 and the image generating block 67 every time a VD signal is supplied from the control block 61 of the CG image generating apparatus 23.

This examples explains the function of parameter continuous change (or parameter automatic progression). To be more specific, this function specifies parameters and intervals to continuously change parameters during a certain period of time (=the number of frames) rather than requiring the user to manually operate frames or fields and parameters. In this case, an instruction for this function is made up of a parameter operation ID, time (=the number of progression frames), and total variation or variation for each frame (=total variation/the number of progression frames). Means is arranged through which an instruction is issued by the user.

For example, if the user issues an instruction for adjusting a parameter subject to adjustment by multiplying M frames through the operator panel 21, then the operator panel 21 generates an operation signal corresponding to the user's instructing operation and stores the generated operation signal to the control block 61.

To be more specific, in step S181, the operator panel 21 generates an operation signal for starting the adjustment of a parameter subject to adjustment by multiplying M frames and stores the generated operation signal in the memory 21*a*.

Next, the operator panel 21 reads the operation signal from the memory 21*a* when a VD signal is supplied from the control block 61 and supplies the operation signal thus read to the control block 61.

On the basis of the operation signal supplied from the operator panel 21, the control block 61 controls the image generating block 67 to execute the processing operations of step S201 through step S203.

To be more specific, in step S201, the image generating block 67 adjusts the parameter subject to adjustment by adding a variation for one frame to the parameter subject to CG adjustment when a VD signal is supplied from the control block 61.

In step S202, the image generating block 67 determines whether the processing of M frames has ended or not. If the processing is found not ended, then the procedure is returned to step S201 (waiting for a VD signal) to repeat the above-mentioned processing therefrom.

If the processing of M frames is found ended in step S202, then the image generating block 67 ends this processing.

In step S203, the image generating block 67 generates a CG image with the change reflected on the basis of the parameter subject to adjustment adjusted in step S201 when a VD signal next to the VD signal supplied for the processing of step 201 is supplied from the control block 61 and supplies the generated CG image to the display control block 62 to display this CG image on the display block 24.

As described above, if the user has executed an operation such that a parameter subject to adjustment is gradually changed by multiplying M frames through the operator panel 21, a single adjusting operation can reflect the change done onto the all parameters subject to change without repeating the adjusting operation for each of the parameters subject to change. In addition, this configuration provides a viewer of CG images a smooth change, thereby enhancing the added value of the CG images.

It should be noted that, as clear from the explanation described above, interlocking the control of each component block in synchronization with a VD signal can realize a change (or a transition) that progresses in the same quantity for each framer or field, thereby enhancing the added value of CG images.

Meanwhile, the CG generating apparatus 22 shown in FIG. 1 generates CG description data and stores the generated CG description data into the CG description data storage block 63 of the CG image generating apparatus 23.

It should be noted, however, in the CG generating apparatus 22, CG description data that does not include a virtual camera or a virtual light as an element may be generated by the CG generating apparatus 22, depending upon applications for use in generating CG description data. This is because it is convenient for an application for handling CG description data to arrange a virtual camera in accordance with the setting of the application itself, for example.

Therefore, if the CG description data stored in the memory 64*a* read from the CG description data storage block 63 does not include a virtual camera or a virtual light, the specification information generating block 64 can add a virtual camera or a virtual light that is defined by a two or more predetermined parameters to the CG description data.

Details of virtual camera adding processing

The following describes virtual camera adding processing in which the specification information generating block 64 adds a virtual camera to CG description data, with reference to the flowchart shown in FIG. 19.

It should be noted that, because a virtual light is added in the same manner as a virtual camera, the following describes only the processing for adding a virtual camera, skipping the description of virtual light adding processing.

The virtual camera adding processing is started at the first time when a certain piece of (subject) CG description data is handled, as when the specification information generating processing shown in FIG. 12 is executed. To be more specific, the virtual camera adding processing is executed after the start of the specification information generating processing and before the start of the processing of step S22, for example. It should be noted that by what this processing is executed need not be restricted to the specification information generating block 64. The same effects can be obtained if the virtual camera adding processing is executed in any component blocks other than the specification information generating block 64.

To be more specific, in step S221, the specification information generating block 64 executes the processing of step S21 in the specification information generating processing and stores the CG description data into the memory 64a, for example.

In step S222, the specification information generating block 64 determines on the basis of the CG description data stored in the memory 64a whether a virtual camera is written to this CG description data.

If a virtual camera is found not written to the CG description data on the basis of the CG description data stored in the memory 64a, then the specification information generating block 64 moves the procedure to step S223.

In step S223, the specification information generating block 64 adds the description of a predetermined virtual camera to the CG description data stored in the memory 64a.

In step S224, the specification information generating block 64 reads the CG description data with the virtual camera description added from the memory 64a and stores this CG description data into the CG description data storage block 63 in an overwrite manner. Here, the virtual camera adding processing comes to an end.

It should be noted that, if, in step S222, a virtual camera is found written to the CG description data on the basis of the CG description data stored in the memory 64a, the specification information generating block 64 also ends the virtual camera adding processing. It is also practicable to operate the virtual camera adding processing and so on every time CG description data is newly read into the memory 64a without storing the CG description data with a virtual camera added into the CG description data storage block 63.

Then, in the specification information generating processing, the processing of step S22 is started after the completion of the virtual camera adding processing.

As described above, according to the virtual camera adding processing, a predetermined virtual camera is written to CG description data if this CG description data has no virtual camera description and the CG description data written with the predetermined virtual camera is supplied to the CG description data storage block 63 to be stored therein in an overwrite manner.

Consequently, even if a virtual camera is not written in a CG description data stored in the CG description data storage block 63 that is created by a CG creator by use of the CG generating apparatus 22, for example, the three-dimensional position and so on can be set to a parameter subject to adjustment to do the adjustment on the virtual camera.

This holds the same with a virtual light. To be more specific, even if a virtual light is not written to the CG description data stored in the CG description data storage block 63, the three-dimensional position and luminance for example of a virtual light can be set to a parameter subject to adjustment to do the adjustment on the virtual light.

It may be said that a virtual camera always exists in CG image generating processing because the imaging of a virtual space is executed in the generation of a CG image in principle. In the present embodiment, it is necessary for a virtual camera to be handled as an object that can be set to a parameter subject to adjustment, so that the processing of adding a virtual camera is explicitly provided. In imaging (or generating) a CG space (or a virtual space) having no other light emitting bodies, a virtual light is always assumed, so that the virtual light is handled as settable to a parameter subject to adjustment.

Setting the position and so on of the virtual camera to a parameter subject to adjustment is basic to the handling of CG images, so that it is practicable to provide a configuration in which the position and so on of the virtual camera can be adjusted by operator means such as a joystick as default.

(2) Variations

In the present embodiment, the elements making up CG description data are displayed on the display block 24 in a tree structure as shown in FIG. 8. It is also practicable to display these elements as a folder of element descriptors, for example.

In this case, the display block 24 shows folder "VisualSceneNode" having "Lights," "PLACES," "LOGO," "spotLight3," "spotLight4," and "camera3_group" below in a hierarchical structure.

Then, if "Lights" for example is selected as a folder, the display block 24 shows "spotLight2," "spotLight1," "pointLight1," and "BackBoardspotLight1" below "Lights" as folders.

In the present embodiment, specification information for specifying the parameters indicative of the material color of the polygon 121a, position y of a virtual camera, and so on for example as the parameters subject to adjustment. It is also practicable to generate specification information that specifies various other parameters as parameters subject to adjustment.

To be more specific, specification information for specifying parameters and so on for specifying texture to be mapped (or attached) to a polygon can be generated. Further, it is also practicable to generate specification information that specifies two or more parameters in addition to one parameter.

CG description data may include two or more material definitions. "Material of CG object" can be set to a parameter subject to adjustment so as to enable the specification of the selection of a material to be applied to a certain CG object (or a polygon) with a list of these materials as an option.

It should be noted that, in specifying a texture for a CG object or a material including texture mapping, for example, UV coordinates must be defined (or set) in that CG object. Because no texture can be applied to any plane with UV coordinates undefined, if such an option occurs, an alert may be issued telling an error. Alternatively, if a texture is applied to a plane with UV coordinates undefined, UV coordinates may be determined by automatically executing spherical mapping. Still alternatively, cylindrical mapping and spherical mapping may be presented to the user as options to let the user select one.

It is also practicable to set a parameter of affine transformation for UV coordinates (or texture coordinates) to a parameter subject to adjustment. For example, the embodiment ratio of a texture can be changed for zoom in/out by operating two parameters; the zoom-in ratio to U coordinate set to a parameter subject to adjustment and the zoom-in ratio to V coordinate set to another parameter subject to adjustment. Alternatively, if an offset value is set to a parameter subject to adjustment, an offset can be adjusted such as shifting the texture.

If CG description data includes key frame animation for example, as a parameter subject to adjustment, reproduction speed (the speed of progression on time line) is made specifiable. CG description data that includes key frame animation can be operated by arranging operation means such as a push button on the operator panel 21. The reproduction speed at which animation progresses upon pressing of the push button can be controlled with an adjusting knob for example as a parameter subject to adjustment.

The reproduction speed is not the contents of CG description data but the reproduction speed is a value that operates as held in the memory by the image generating block 67, so that the present embodiment can be applied to such a value, allowing the user to operate the reproduction speed.

Alternatively, if CG description data includes two or more virtual cameras as a parameter subject to adjustment, this parameter may be one that allows the user to select one of the virtual cameras.

In the present embodiment, <param_type>float</param_type> is written to specification information to handle an adjustment value corresponding to a user's adjusting operation as float type. In addition to float type, an adjustment value may be handled as 1-byte int type (integer type) or 2-byte int type.

It should be noted that, for 1-byte int type and 2-byte int type, any of signed int type and unsigned int type may be employed to specify a minimum value and a maximum value. It should also be noted that 1-byte int type, 2-byte int type, and so on are can also provide relative/trim instructions for incrementing or decrementing each adjustment value by 1.

For the coding adjustment values such as H value, L value, and S value, for example, values 0x0000 to 0xffff are used. If a value from 0x0000 to 0xffff is used as a sign of an adjustment value, the maximum and minimum values of the adjustment value can be specified and, in accordance with a user's adjusting operation, a relative/trim instruction for incrementing or decrementing the sign of the adjustment value can be issued.

In addition, an adjustment value may be handled as enum type (enumeration type) for using any one of two or more previously enumerated values, for example. The maximum and minimum values in the two or more enumerated values are determined in advance by enum type definition. In this case, it is practicable to display the name given to the value of enum type as a current value on display means that is shown in correspondence with the adjustment knob.

Moreover, in the present embodiment, the value of a parameter subject to adjustment after the adjustment by a user's adjusting operation is used as an adjustment value. It is also practicable to employ, as an adjustment value, only the variation part of a parameter subject to adjustment that varies in accordance with a user's adjusting operation, for example.

In the present embodiment, in order to identify the CG description data including a parameter subject to adjustment specified by specification information, the identifier of the CG description data including a parameter subject to adjustment specified by specification information is included in that specification information or a derived information file. However, other methods than that described above may be used to identify the CG description data corresponding to specification information or a derived information file.

To be more specific, link information for relating specification information or a derived information file with the CG description data including a parameter subject to adjustment specified by the specification information may be newly held in the CG image generating apparatus 23, thereby identifying the CG description data corresponding to the specification information on the basis of this link information, for example.

It should be noted that, for the link information, a table or the like in which specification information or a derived information file is related with the corresponding CG description data is possible, for example. If specification information or a derived information file and the corresponding CG description data are included in a same directory (or a folder), for example, the directory (structure) including the specification information and the CG description data may be employed as link information indicative that specification information is related with the CG description data.

Further, below or above a directory including specification information or a derived information file, configuring a directory structure for storing the CG description data related with this specification information in a uniquely definable relation and storing the CG description data in this directory structure allow the use of this directory structure as link information.

It should be noted that, if specification information or a derived information file does not include the identifier or link information for identifying corresponding CG description data, the user selects the corresponding CG description data along with specification information. In this case, a selection error may cause a situation in which specification information cannot be used. If this happens, it is practicable to provide a solution, such as error display.

In the present embodiment, the image generating block 67 holds two or more values in the memory 67a as the values of parameters subject to adjustment adjusted before a user's adjusting operation and, if the user specifies any one of the values adjusted before the user's adjusting operation through the operator panel 21, a parameter subject to adjustment can be returned to the value of the parameter subject to adjustment specified by the user (namely, a so-called memory function can be provided).

In response to an update operation done by the user through the operator panel 21 to update the adjustment instruction information included in specification information or a derived information file, the image generating block 67 can update the adjustment instruction information included in the specification information.

To be more specific, if the user has executed an update operation, the load indication block 66 reads a specification information or a derived information file including the adjustment instruction information subject to update from the specification information storage block 65 under the control of the control block 61 that has received an operation signal corresponding to the user's update operation in the image generating block 67, for example. Then, the load indication block 66 updates the adjustment instruction information subject to update included in the read specification information or derived information file and stores the updated adjustment instruction information into the specification information storage block 65 in an overwrite manner.

Consequently, in the adjustment instruction information subject to update, the value indicated on the basis of the adjustment instruction information can be updated.

In the present embodiment, the operator panel 21 and the CG image generating apparatus 23 are separately configured, for example. It is also practicable to arrange the operator panel 21 inside the CG image generating apparatus 23, for example.

Alternatively, it is practicable to configure the components of the CG image generating apparatus 23 shown in FIG. 4 not in a unitized device but separate devices that are interconnected through a network. The following describes one example based on this configuration also as an alternative example of the configuration shown in FIG. 1.

The CG generating apparatus 22 can be realized by installing CG creating application software in a personal computer. The user operates this personal computer to generate CG description data. The user can generally check the contents of CG drawing on this computer.

In CG creation processing, the user can create CG by being aware that a desired value provides a parameter subject to adjustment. For example, if the same color is assigned to one CG object (a polygon) and another CG object (a polygon) and this color is set to a parameter subject to adjustment, the same material can be applied to both (the CG objects), thereby assigning the material with a name easy to understand at the creation of specification information.

Many CG creating application software programs normally employs unique file formats for storing created CG. However, these programs often provide an additional function of writing out (or exporting) the CG contents in a standard CG description data format. The user can activate this export function to write out the contents of the created CG as a CG description data file.

Then, the file of the created CG description data is supplied by the user to the CG description data storage block 63 via a network. For one example, the user can operate a server function in a personal computer in which the CG creating application software is activated, publish a part of the local disk to the network, and copy a file to the CG description data storage block 63 by use of a function equivalent to the control block of the CG image generating apparatus 23.

This copy operation can be activated by detecting the generation of a file of new CG description data by use of known techniques with ease.

It is also practicable for the specification information generating block 64 to be realized as the function (hereafter referred to as edit means) of software that operates on another personal computer. It is further practicable for the specification information storage block 65 to be handled as a function that is stored as a file in a file system on a hard disk drive for example along with the CG description data storage block 63.

The edit means communicates with the control block 61 via a network to direct the reading of CG description data from the file system and writing of CG description data to a derived information file, thereby transferring information. UI (User Interface) of the edit means may be realized by use of GUI on the personal computer. On this GUI, a list or contents of CG description data may be displayed.

A function of supporting a load operation can be arranged on the load indication block 66 to enable the user to select a derived information file as the GUI of the edit means for a load instruction input operation. The edit means sends a load instruction to the control block 61 via the network. The control block 61 supplies the received load instruction to the load indication block. The load indication block reads the specified derived information file and stores the specification information having the specified contents and the specified CG description data into the memory of the image generating block.

It should be noted that the load specification block can be realized as software that operates on the same CPU (or a microcomputer having the CPU).

In the above explanation, the case in which CG description data and specification information or a derived information file are included in the CG image generating apparatus 23. The embodiments of the present invention is also applicable to a configuration in which CG description data and specification information or a derived information file are not placed in a local storage.

For example, CG description data and specification information or a derived information file may be stored in remote storage means that can be accessed via a network to be retrieved as required. It is also practicable to create and edit specification information or a derived information file from an apparatus (a personal computer for example) that can be connected to the remote storage means.

It should be noted that the above-mentioned sequence of processing operations may be executed by software as well as hardware. When the above-mentioned sequence of processing operations is executed by software, the programs constituting the software are installed in a computer which is built in dedicated hardware equipment or installed, from a network or recording media, into a general-purpose personal computer for example in which various programs may be installed for the execution of various functions.

Exemplary configuration of a computer

Referring to FIG. 20, there is shown an exemplary configuration of a personal computer on which a sequence of processing operations described above is executed.

A CPU (Central Processing Unit) 201 executes various processing operations as instructed by programs stored in a ROM (Read Only Memory) 202, or a storage block 208. A RAM (Random Access Memory) 203 appropriately stores programs and data for use by the CPU 201. These CPU 201, ROM 202, and RAM 203 are interconnected by a bus 204.

The CPU 201 is also connected to an input/output interface 205 via the bus 204. The input/output interface 205 is connected to an input block 206 having a keyboard, a mouse, and a microphone, for example, and an output block 207 having a monitor display and a loudspeaker, for example. The CPU 201 executes various processing operations in response to instructions entered through the input block 206. Then, the CPU 201 outputs processing results to the output block 207.

The storage block 208 connected to the input/output interface 205 is made up of a hard disk drive for example and stores programs and various kinds of data for use by the CPU 201. A communication block 209 communicates with external apparatuses via a network, such as the Internet or a local area network.

It is also practicable to get programs through the communication block 209 and store the obtained programs in the storage block 208.

A drive 210 connected to the input/output interface 205 drives a removable media 211, such as a magnetic disk, an optical disk, a magneto-optical disk, or a semiconductor memory when the removable media 211 is loaded on the drive 210, thereby obtaining programs and data from the removable media 211. The obtained programs and data are stored in the storage block 208 as required.

As shown in FIG. 20, program recording media for storing programs that are installed on a computer for execution is made up of the removable media 211 that are package media made up of a magnetic disc (including a flexible disc), an optical disc (including CD-ROM (Compact Disc-Read Only Memory), a DVD (Digital Versatile Disc), a magneto-optical disc, or a semiconductor memory, the ROM 202 in which programs are temporarily or permanently stored, or a hard disc drive that forms the storage block 208. Storing of programs into program recording media is executed by use of wired or wireless communication media, such as a LAN, the Internet, or digital satellite broadcasting, via the communication block 209 that provides an interface, such as a router and a modem, as required.

It should be noted herein that the steps for describing each program recorded in recording media include not only the processing operations which are sequentially executed in a time-dependent manner but also the processing operations which are executed concurrently or discretely.

It should also be noted that term "system" as used herein denotes an entire apparatus configured by a plurality of component units.

While preferred embodiments of the present invention have been described using specific terms, such description is for illustrative purpose only, and it is to be understood that changes and variations may be made without departing from the spirit or scope of the following claims.

The present application contains subject matter related to that disclosed in Japanese Priority Patent Application JP 2010-089029 filed in the Japan Patent Office on Apr. 7, 2010, the entire content of which is hereby incorporated by reference.

It should be understood by those skilled in the art that various modifications, combinations, sub-combinations and alterations may occur depending on design requirements and other factor in so far as they are within the scope of the appended claims or the equivalents thereof.

What is claimed is:

1. A generating apparatus comprising:
   display control means for, on the basis of computer graphics description data for use in creating a computer graphics virtual space necessary for generating a computer graphics image, displaying a plurality of element descriptors representative of a plurality of elements arranged in said computer graphics virtual space, the plurality of element descriptors include at least (a) light indicative of virtual lights for virtually projecting light on to a computer graphics object, (b) places indicative of a subject of texture mapping arranged at a predetermined position, (c) logo indicative of a polyhedron arranged in a scene and (d) cameras indicative of virtual cameras virtually capturing the computer graphics object; and
   specification information generating means for generating specification information for specifying a parameter for defining an element corresponding to an element descriptor based upon a selecting operation by a user from among the displayed plurality of element descriptors as a parameter subject to adjustment that is adjusted by am adjusting operation by said user.

2. The generating apparatus according to claim 1, wherein said display control means displays said plurality of element descriptors in a tree-shaped hierarchical structure.

3. The generating apparatus according to claim 2, further comprising:
   specification information holding means for holding a plurality pieces of said specification information generated by said specification information generating means;
   reading means for reading specification information selected by a selecting operation by said user from among said plurality of pieces of specification information held in said specification information holding means;
   setting means for setting a parameter specified by said specification information read as above from among a plurality of parameters included in said computer graphics description data, as said parameter subject to adjustment;
   adjusting means for adjusting said parameter subject to adjustment in response to an adjusting operation by said user; and
   image generating means for generating said computer graphics image on the basis of said computer graphics description data with said parameter subject to adjustment adjusted.

4. The generating apparatus according to claim 2, wherein said display control means displays a plurality of parameters for defining an element corresponding to an element descriptor selected by the selecting operation by said user from among the plurality of displayed element descriptors; and
   said specification information generating means generates specification information for specifying a parameter indicated by an indicating operation by a user from among said plurality of displayed parameters as said parameter subject to adjustment.

5. The generating apparatus according to claim 3, further comprising
   mode setting means for setting an operation mode of said generating apparatus in response to a mode setting operation by said user to one of a specification information generating mode and a parameter adjusting mode;
   wherein said specification information generating means generates said specification information only when said generating apparatus is set to said specification information generating mode, and
   said adjusting means adjusts said parameter subject to adjustment only when said generating apparatus is set to said parameter adjusting mode.

6. A generating method for a generating apparatus for generating specification information for use in computer graphics manipulation, said generating apparatus having display control means and specification information generating means, said generating method comprising the steps of:
   on the basis of computer graphics description data for use in creating a computer graphics virtual space necessary for generating a computer graphics image, displaying a plurality of element descriptors representative of a plurality of elements arranged in said computer graphics virtual space, the plurality of element descriptors include at least (a) light indicative of virtual lights for virtually projecting light on to a computer graphics object, (b) places indicative of a subject of texture mapping arranged at a predetermined position, (c) logo indicative of a polyhedron arranged in a scene and (d) cameras indicative of virtual cameras virtually capturing the computer graphics object; and
   generating specification information for specifying a parameter for defining an element corresponding to an element descriptor based upon a selecting operation by a user from among the displayed plurality of element descriptors as a parameter subject to adjustment that is adjusted by an adjusting operation by said user.

7. A program stored on a non-transitory recording medium for causing a computer to function as:
   display control means for, on the basis of computer graphics description data for use in creating a computer graphics virtual space necessary for generating a computer graphics image, displaying a plurality of element descriptors representative of a plurality of elements arranged in said computer graphics virtual space, the plurality of element descriptors include at least (a) light indicative of virtual lights for virtually projecting light on to a computer graphics object, (b) places indicative of a subject of texture mapping arranged at a predetermined position, (c) logo indicative of a polyhedron arranged in a scene and (d) cameras indicative of virtual cameras virtually capturing the computer graphics object; and specification information generating means for generating specification information for specifying a parameter for defining an element corresponding to an element descriptor based upon a selecting operation by a user from among the displayed plurality of element descriptors as a parameter subject to adjustment that is adjusted by an adjusting operation by said user.

8. A generating apparatus comprising:

an operator panel;

a display controller configured, on the basis of computer graphics description data for use in creating a computer graphics virtual space necessary for generating a computer graphics image, to display a plurality of element descriptors representative of a plurality of elements arranged in said computer graphics virtual space, the plurality of element descriptors include at least (a) light indicative of virtual lights for virtually projecting light on to a computer graphics object, (b) places indicative of a subject of texture mapping arranged at a predetermined position, (c) logo indicative of a polyhedron arranged in a scene and (d) cameras indicative of virtual cameras virtually capturing the computer graphics object; and a specification information generator configured to generate specification information for specifying a parameter for defining an element corresponding to an element descriptor by a selecting operation by a user from among the displayed plurality of element descriptors as a parameter subject to adjustment that is adjusted by an adjusting operation by said user.

* * * * *